(12) United States Patent
Kouno et al.

(10) Patent No.: US 12,531,416 B2
(45) Date of Patent: Jan. 20, 2026

(54) POWER CONTROL SYSTEM AND HEAT PUMP SYSTEM

(71) Applicant: DAIKIN INDUSTRIES, LTD., Osaka (JP)

(72) Inventors: Masaki Kouno, Osaka (JP); Reiji Kawashima, Osaka (JP); Toshiyuki Maeda, Osaka (JP); Keisuke Ohta, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 202 days.

(21) Appl. No.: 18/026,184

(22) PCT Filed: Sep. 21, 2021

(86) PCT No.: PCT/JP2021/034645
§ 371 (c)(1),
(2) Date: Mar. 14, 2023

(87) PCT Pub. No.: WO2022/071034
PCT Pub. Date: Apr. 7, 2022

(65) Prior Publication Data
US 2023/0358455 A1 Nov. 9, 2023

(30) Foreign Application Priority Data

Sep. 30, 2020 (JP) ................. 2020-164993

(51) Int. Cl.
*H02J 3/18* (2006.01)
(52) U.S. Cl.
CPC ......... *H02J 3/1842* (2013.01); *H02J 2310/58* (2020.01)
(58) Field of Classification Search
CPC ............... H02J 2310/58; H02J 2310/50; H02J 3/1842
See application file for complete search history.

(56) References Cited

U.S. PATENT DOCUMENTS

| 9,395,741 B2 | 7/2016 | Shiga et al. |
| 2011/0109266 A1* | 5/2011 | Rossi ............ B60L 53/63 307/18 |

(Continued)

FOREIGN PATENT DOCUMENTS

| JP | 2015-211480 A | 11/2015 |
| JP | 2018-191374 A | 11/2018 |

(Continued)

OTHER PUBLICATIONS

International Search Report (PCT/ISA/210) issued in PCT/JP2021/034645, dated Dec. 14, 2021.

(Continued)

*Primary Examiner* — Harry R Behm
(74) *Attorney, Agent, or Firm* — Birch, Stewart, Kolasch & Birch, LLP

(57) ABSTRACT

[Object] On the basis of a limit of an operation of a control unit that is connected to a power-receiving path of a converting unit, is electrically parallel with the converting unit, and controls apparent power in the power-receiving path of the converting unit, the operation of the control unit is controlled.

[Solution] A power control system includes: an acquisition section that acquires control unit information related to a limit of an operation by a control unit provided for a heat pump system that regulates temperature and/or humidity; and a control section that controls an operation of the control unit on the basis of the control unit information. The control unit is connected to a power-receiving path of a converting unit that converts received power and supplies the converted power to a load used for the regulating. The (Continued)

control unit is electrically parallel with the converting unit. The control unit controls apparent power in the power-receiving path.

12 Claims, 7 Drawing Sheets

(56) References Cited

U.S. PATENT DOCUMENTS

2019/0252881 A1* 8/2019 Kono ................ H02M 1/12
2020/0142437 A1* 5/2020 Kono ................ H02J 3/14

FOREIGN PATENT DOCUMENTS

JP    2020-043747 A     3/2020
WO    WO-2018199333 A1 * 11/2018 ............ G05F 1/70

OTHER PUBLICATIONS

Extended European Search Report for European Application No. 21875336.6, dated Apr. 4, 2024.

* cited by examiner

FIG.5

| HPS | PASSED ELECTRICAL LINE | OPERATING TIME PERIOD | | NUMBER OF TIMES OF OPERATIONS | | POWER AMOUNT | | AMBIENT TEMPERATURE | | CHLORIDE ION CONCENTRATION | REMAINING TIME | | REGULATABLE AMOUNT |
|---|---|---|---|---|---|---|---|---|---|---|---|---|---|
| | | POWER-CONVERTING APPARATUS | AF | POWER-CONVERTING APPARATUS | AF | POWER-CONVERTING APPARATUS | AF | POWER-CONVERTING APPARATUS | AF | | HPS | AF | |
| 21A | 17A | Op1 | Oa1 | Np1 | Na1 | Ep1 | Ea1 | Tp1 | Ta1 | C1 | 20000 | 10000 | 60 |
| 21B | 17A | Op2 | Oa2 | Np2 | Na2 | Ep2 | Ea2 | Tp2 | Ta2 | C2 | 18000 | 8000 | 50 |
| 21C | 17A | Op3 | Oa3 | Np3 | Na3 | Ep3 | Ea3 | Tp3 | Ta3 | C3 | 16000 | 6000 | 45 |
| 21D | 17A | Op4 | Oa4 | Np4 | Na4 | Ep4 | Ea4 | Tp4 | Ta4 | C4 | 17000 | 7000 | 30 |
| 21E | 17A | Op5 | Oa5 | Np5 | Na5 | Ep5 | Ea5 | Tp5 | Ta5 | C5 | 8000 | 500 | 40 |
| 21F | 17B | Op6 | Oa6 | Np6 | Na6 | Ep6 | Ea6 | Tp6 | Ta6 | C6 | 10000 | 1000 | 50 |
| 21G | 17B | Op7 | Oa7 | Np7 | Na7 | Ep7 | Ea7 | Tp7 | Ta7 | C7 | 13000 | 4500 | 50 |
| 21H | 17B | Op8 | Oa8 | Np8 | Na8 | Ep8 | Ea8 | Tp8 | Ta8 | C8 | 11000 | 5000 | 35 |
| 21I | 17B | Op9 | Oa9 | Np9 | Na9 | Ep9 | Ea9 | Tp9 | Ta9 | C9 | 9000 | 600 | 60 |
| 21J | 17B | Op10 | Oa10 | Np10 | Na10 | Ep10 | Ea10 | Tp10 | Ta10 | C10 | 10000 | 4000 | 40 |
| ... | ... | ... | ... | ... | ... | ... | ... | ... | ... | ... | ... | ... | ... |

POWER CONTROL SYSTEM AND HEAT PUMP SYSTEM

TECHNICAL FIELD

The present disclosure relates to a power control system and a heat pump system.

BACKGROUND ART

PTL 1 describes that the order of priorities of active-power control and reactive-power control is determined on the basis of an estimated remaining lifetime of each power conditioner.

CITATION LIST

Patent Literature

PTL 1: Japanese Unexamined Patent Application Publication No. 2015-211480

SUMMARY OF INVENTION

Technical Problem

PTL 1 discloses that on the basis of the lifetime of a converting unit that converts power, the operation of the converting unit is controlled. However, PTL 1 does not disclose that on the basis of the limit of operations of a control unit that is connected to a power-receiving path of a converting unit, is electrically parallel with the converting unit, and controls apparent power in the power-receiving path of the converting unit, the operation of the control unit is controlled.

An object of the present disclosure is to control, on the basis of the limit of an operation of a control unit that is connected to a power-receiving path of a converting unit, is electrically parallel with the converting unit, and controls apparent power in the power-receiving path of the converting unit, the operation of the control unit.

Solution to Problem

A power control system of the present disclosure includes: an acquisition section that acquires control unit information related to a limit of an operation by a control unit provided for a heat pump system that regulates temperature and/or humidity; and a control section that controls an operation of the control unit on the basis of the control unit information. The control unit is connected to a power-receiving path of a converting unit that converts received power and supplies the converted power to a load used for the regulating. The control unit is electrically parallel with the converting unit. The control unit controls apparent power in the power-receiving path. In this case, on the basis of the limit of an operation of the control unit that is connected to the power-receiving path of the converting unit, is electrically parallel with the converting unit, and controls apparent power in the power-receiving path of the converting unit, the operation of the control unit is controlled.

Here, the limit of an operation may be a time point at which a predetermined operation becomes impossible due to a temporal change. In this case, the operation of the control unit is controlled according to a time point at which the control unit becomes unable to perform a predetermined operation due to the temporal change.

Further, the heat pump system may receive power from an electrical line of a power distribution system, via a power distribution transformer, the control unit may regulate apparent power in the electrical line, and the control section may control, on the basis of the control unit information, an operation of the control unit for regulating apparent power in the electrical line. In this case, compared with a case where the operation of the control unit is controlled regardless of the limit of an operation by the control unit, the apparent power in the electrical line is regulated with the contents of the regulating suitable for the limit of an operation by the control unit.

Further, the control unit information may be information related to an operation of the control unit that affects the limit and/or related to an environment of the control unit. In this case, compared with a case where the operation of the control unit is controlled on the basis of information not related to the control unit, the control unit is operated with the contents suitable for the control unit.

Further, the control section may control an operation of the control unit on the basis of a relationship between an indicator related to a limit of an operation of the heat pump system for regulating temperature and/or humidity and an indicator related to the limit of an operation of the control unit. In this case, compared with a case where the operation of the control unit is controlled regardless of the indicator related to the limit of an operation of the heat pump system for regulating temperature and/or humidity, the control unit is operated such that the indicator related to the limit of an operation of the heat pump system for regulating temperature and/or humidity, and the indicator related to the limit of an operation of the control unit have a suitable relationship.

Further, in a case where an indicator related to the limit satisfies a preset condition, the control section may restrict an operation of the control unit for regulating apparent power in the electrical line. In this case, compared with a case where the operation of the control unit is not restricted even in a case where the indicator satisfies the preset condition, the occurrence of a failure in the control unit is suppressed.

Further, the condition may include a first condition and a second condition different from each other, and in a case where the indicator satisfies the first condition and does not satisfy the second condition, the control section may restrict the operation for regulating apparent power in the electrical line and may not restrict the operation for controlling apparent power in the power-receiving path, and in a case where the indicator satisfies both the first condition and the second condition, the control section may restrict both the operation for regulating apparent power in the electrical line and the operation for controlling apparent power in the power-receiving path. In this case, according to the limit of an operation of the control unit, stepwise control is performed for the restriction of an operation for suppressing a failure of the control unit.

Further, the heat pump system may be provided with a heat-exchanging unit that performs heat exchange, the acquisition section may acquire environmental information related to an environment of the heat-exchanging unit, and the control section may control an operation of the control unit on the basis of the control unit information and the environmental information. In this case, the operation of the control unit is controlled according to the influence, on the limit of an operation of the control unit, of the environment of the heat-exchanging unit.

Further, the regulating of apparent power in the electrical line may include regulating a power factor in the electrical line and regulating harmonics in the electrical line, and the control section may determine, on the basis of the control unit information, a target, in the electrical line, that the control section may make the control unit regulate. In this case, compared with a case where a target that the control section may make the control unit regulate is determined regardless of the limit of an operation by the control unit, a target, in the electrical line, that the control section may make the control unit regulate is appropriately determined.

Further, the control unit information may be an indicator related to the limit, a predetermined first condition and a second condition related to being closer to the limit than the first condition may be set for the indicator, and in a case where the indicator satisfies the first condition, the control section may make the control unit regulate a power factor in the electrical line, and in a case where the indicator satisfies the second condition, the control section may make the control unit regulate harmonics in the electrical line. In this case, according to the limit of an operation of the control unit, the magnitude of the load generated in the control unit due to the regulating of apparent power in the electrical line is regulated.

Further, the power control system may further include an output section that, in a case where the control unit is regulating apparent power in the electrical line, and an indicator related to the limit satisfies a preset condition, outputs information related to the heat pump system. In this case, compared with a case where information related to the heat pump system is output regardless of whether or not the indicator satisfies the preset condition, output of information related to the heat pump system that is not suitable for output from the viewpoint of the limit of an operation of the control unit is suppressed.

Further, a heat pump system of the present disclosure regarded from another viewpoint is a heat pump system for regulating temperature and/or humidity. The heat pump system includes: a converting unit that converts received power and supplies the converted power to a load used for the regulating; a control unit that is connected to a power-receiving path of the converting unit, is electrically parallel with the converting unit, and controls apparent power in the power-receiving path; an acquisition section that acquires control unit information related to a limit of an operation by the control unit; and a control section that controls an operation of the control unit on the basis of the control unit information. In this case, on the basis of the limit of an operation of the control unit that is connected to the power-receiving path of the converting unit, is electrically parallel with the converting unit, and controls apparent power in the power-receiving path of the converting unit, the operation of the control unit is controlled.

BRIEF DESCRIPTION OF DRAWINGS

FIG. 5 is a diagram illustrating a HPS management table.

DESCRIPTION OF EMBODIMENTS

Hereinafter, an embodiment will be described with reference to the accompanying drawings.

Figure 1:
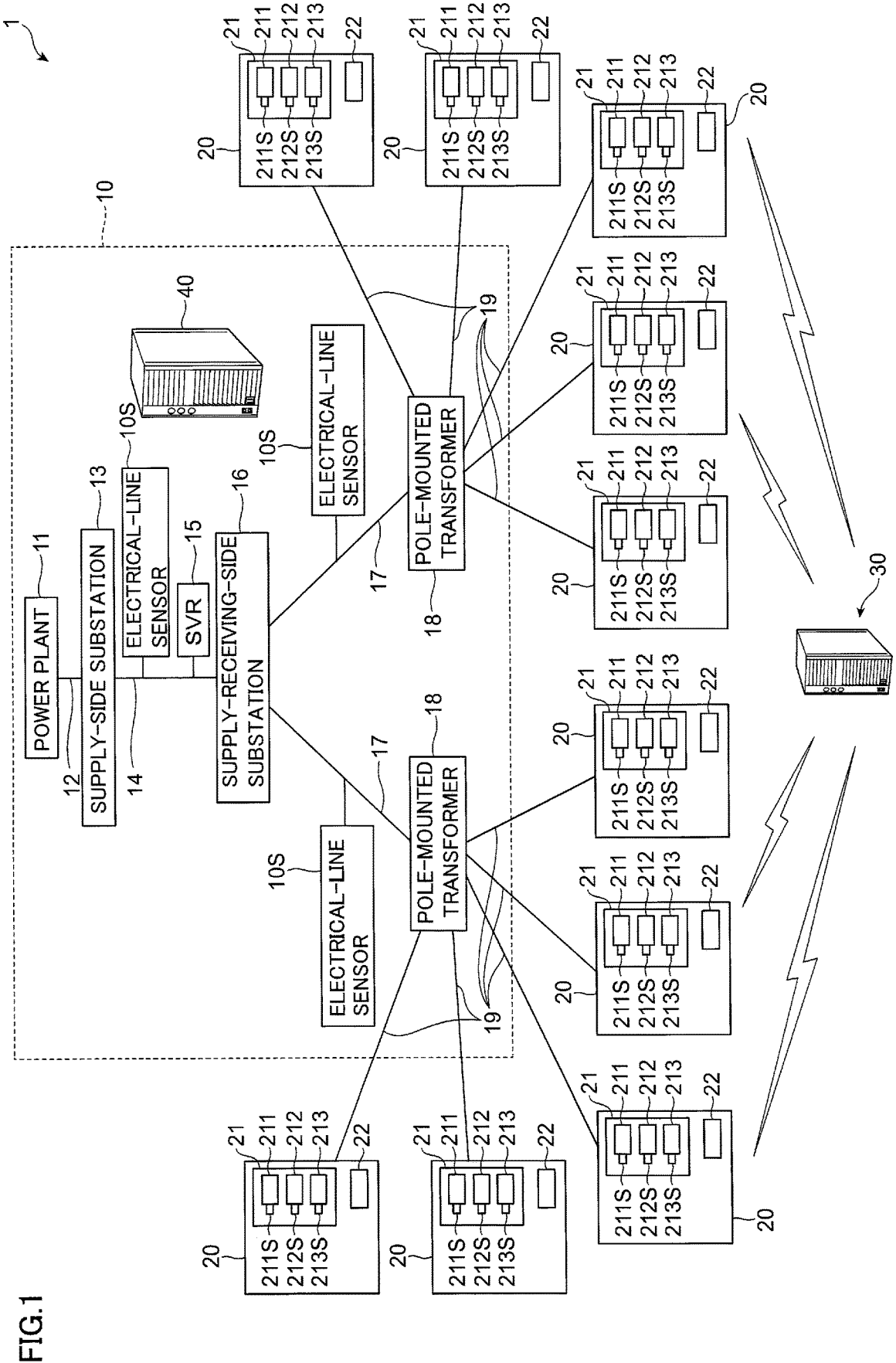
FIG. 1 is a diagram illustrating an example of a power control system according to a present embodiment.

FIG. 1 is a diagram illustrating an example of a power control system 1 according to the present embodiment.

The power control system 1 is a system that controls apparent power.

The power control system 1 is provided with a power system 10, a plurality of power consumption facilities 20, a control server 30, and an instruction server 40.

The power system 10 is a system in which installations for supplying power to power consumers are provided. The power system 10 is provided with a power plant 11, a power transmission line 12, a supply-side substation 13, a supply-side power distribution line 14, an automatic voltage regulator (step voltage regulator (SVR)) 15, a supply-receiving-side substation 16, supply-receiving-side power distribution lines 17, pole-mounted transformers 18, and consumer-side power distribution lines 19.

The power plant 11 is an installation that generates power. Examples of the power plant 11 include a thermal power plant, a hydroelectric power plant, a nuclear power plant, a solar power plant, a wind power plant, and a geothermal power plant.

The power transmission line 12 is a line through which a current constituting the power generated by the power plant 11 flows. The power transmission line 12 is provided from the power plant 11 to the supply-side substation 13.

The supply-side substation 13 is an installation that converts voltage. The supply-side substation 13 is provided closer to the power supply side than the supply-receiving-side substation 16 is. In the present embodiment, an installation located closest to the power supply side is the power plant 11. Further, installations located closest to the power-supply-receiving-side are the power consumption facilities 20.

The supply-side substation 13 converts the voltage supplied through the power transmission line 12. Examples of the supply-side substation 13 include a substation that converts a voltage of 500,000 V into 154,000 V, a substation that converts a voltage of 154,000 V into 66,000 V, and a substation that converts a voltage of 66,000 V into 22,000 V.

The supply-side power distribution line 14 is a line through which a current generated by application of the voltage converted by the supply-side substation 13 flows. The supply-side power distribution line 14 is provided from the supply-side substation 13 to the supply-receiving-side substation 16. Further, the supply-side power distribution line 14 is provided closer to the power supply side than the supply-receiving-side power distribution lines 17 are.

The SVR 15 regulates the voltage supplied to the supply-side power distribution line 14. More specifically, the SVR 15 detects the voltage supplied to the supply-side power distribution line 14. In a case where the detected voltage is not within a preset range, the SVR 15 regulates the voltage so that the voltage becomes within the preset range.

The supply-receiving-side substation 16 is an installation that converts the voltage supplied through the supply-side power distribution line 14. Examples of the supply-receiving-side substation 16 include a substation that converts the supplied voltage into 6,600 V.

The supply-receiving-side power distribution lines 17 are lines through which a current generated by application of the voltage converted by the supply-receiving-side substation 16 flows. The supply-receiving-side power distribution lines 17 are provided from the supply-receiving-side substation 16 to the pole-mounted transformers 18. Note that in the present embodiment, in a case where the supply-side power distribution line 14 and the supply-receiving-side power distribution lines 17 are described without being particularly distinguished from each other, they may be simply referred to as the "electrical lines".

The pole-mounted transformers 18 as an example of a power distribution transformer are installations that convert the voltage supplied through the supply-receiving-side power distribution lines 17. Examples of the pole-mounted transformers 18 include a transformer that converts a voltage of 6,600 V into 200 V, and a transformer that converts a voltage of 6,600 V into 100 V.

The consumer-side power distribution lines 19 are lines through which a current generated by application of the voltage converted by the pole-mounted transformers 18 flows. The power system 10 is provided with the plurality of consumer-side power distribution lines 19. More specifically, the consumer-side power distribution lines 19 are provided for the power consumption facilities 20, respectively. Each consumer-side power distribution line 19 is provided from the pole-mounted transformer 18 to the power consumption facility 20.

As described above, the power system 10 is a system provided outside the power consumption facilities 20, and is a system for distributing the generated power to the power consumers. Therefore, the power system 10 is also regarded as a power distribution system.

Further, the power system 10 is provided with a plurality of electrical-line sensors 10S. The electrical-line sensor 10S is connected to the supply-side power distribution line 14. More specifically, the electrical-line sensor 10S is connected to a portion of the supply-side power distribution line 14 closer to the power supply side than the SVR 15 is. Further, the electrical-line sensors 10S are connected to the supply-receiving-side power distribution lines 17, respectively. In other words, the electrical-line sensors 10S are provided for the supply-side power distribution line 14 and the supply-receiving-side power distribution lines 17, respectively.

The electrical-line sensor 10S detects a parameter related to the apparent power in the electrical line with which the electrical-line sensor 10S is connected. The parameter related to the apparent power is a parameter that influences the apparent power. Examples of the parameter related to the apparent power include apparent power, reactive power, reactive voltage, harmonic voltage, current, power factor, and apparent power amount and reactive power amount in a preset period. The current as the parameter related to the apparent power includes a harmonic current. Further, for example, the harmonic voltage or the harmonic current may be a harmonic voltage or a harmonic current of a specific degree. Examples of the specific degree include a harmonic of a degree of five. Further, examples of the parameter related to the apparent power include a total harmonic distortion (THD) of the current and a THD of the voltage. Here, the THD of the current is calculated from Expression (1) below. Further, the THD of the voltage is calculated from Expression (2) below.

$$THD = \sqrt{\sum_{n=2}^{40}\left(\frac{I_n}{I_1}\right)^2} \quad (1)$$

$$THD = \sqrt{\sum_{n=2}^{40}\left(\frac{V_n}{V_1}\right)^2} \quad (2)$$

In Expression (1) above, $I_1$ is a fundamental-wave current. Further, $I_n$ is a harmonic current of a degree of n.

In Expression (2) above, $V_1$ is a fundamental-wave voltage. Further, $V_n$ is a harmonic voltage of a degree of n.

For example, the electrical-line sensor 10S detects the above-described parameter related to the apparent power at preset time intervals. The preset time intervals may be any time, but are, for example, 60 seconds. When the electrical-line sensor 10S detects the parameter related to the apparent power, the electrical-line sensor 10S transmits, to the instruction server 40, information indicating the detected parameter, together with electrical-line identification information for identifying the electrical line as the detection target.

Note that in the illustrated example, the one supply-side substation 13 is illustrated in the power system 10, but the number of the supply-side substation 13 is not limited to one as illustrated. For example, the power system 10 may be provided with two or more supply-side substations 13 that convert the same voltage or different voltages.

Further, in the illustrated example, the one supply-receiving-side substation 16 is illustrated in the power system 10, but the number of the supply-receiving-side substation 16 is not limited to one as illustrated. For example, the power system 10 may be provided with two or more supply-receiving-side substations 16 that convert the same voltage or different voltages.

Further, the number of the supply-side power distribution line 14 and the number of the supply-receiving-side power distribution lines 17 are not limited to the illustrated example. For example, the power system 10 may be provided with more supply-side power distribution lines 14 and supply-receiving-side power distribution lines 17 than the illustrated number. In this case, for example, the electrical-line sensor 10S may be provided for each supply-side power distribution line 14, and the electrical-line sensor 10S may be provided for each supply-receiving-side power distribution line 17.

The power consumption facilities 20 are facilities that receive and consume power supplied from the power plant 11 through the consumer-side power distribution lines 19. Each power consumption facility 20 is provided with a heat pump system (HPS) 21 and load equipment 22.

The HPS 21 uses power received from the power system 10 to regulate temperature or humidity. As targets of regulating by the HPS 21, the temperature or humidity of the space in the power consumption facility 20 are exemplified. Further, as a target of regulating by the HPS 21, the temperature of the liquid provided in the power consumption facility 20 is exemplified. In the present embodiment, each HPS 21 is provided with a regulating unit 211, a power-converting apparatus 212, and an active filter (AF) 213.

The regulating unit 211 as an example of a load regulates temperature or humidity. The regulating unit 211 is provided with a motor (not illustrated) that operates using the received power. Further, the regulating unit 211 is provided with a heat exchanger (not illustrated). Through the heat exchanger, heat exchange of the air or liquid in the power consumption facility 20 is performed. Therefore, the regulating unit 211 is also regarded as a heat-exchanging unit that performs heat exchange.

Note that in the illustrated example, the regulating unit 211 is provided in the power consumption facility 20, which is not limiting. For example, the regulating unit 211 may be provided outside the power consumption facility 20.

The power-converting apparatus 212 as an example of a converting unit includes an inverter (not illustrated) and a converter (not illustrated). The power-converting apparatus 212 uses the inverter and the converter to convert received power into power having a specific voltage and a specific frequency. The specific voltage and the specific frequency are a voltage and a frequency necessary for the operation of the motor provided in the regulating unit 211. The power-converting apparatus 212 supplies the converted power to the regulating unit 211.

The AF 213 as an example of a control unit aims to improve the power factor and reduce harmonics in the HPS 21. Although the details will be described later, the AF 213 supplies a current to a path in the HPS 21 through which power to be received by the power-converting apparatus 212 passes, to improve the power factor and reduce harmonics in the path. Hereinafter, the path in the HPS 21 through which power to be received by the power-converting apparatus 212 passes may be referred to as a power-receiving path.

Further, in the present embodiment, the AF 213 supplies a current to the power system 10. The AF 213 supplies a current to the electrical lines in the power system 10 to regulate the above parameter related to the apparent power in the electrical lines. In other words, the AF 213 of the present embodiment regulates the apparent power in the electrical lines of the power distribution system. Regulating the apparent power is to regulate one or both of the active power and the reactive power. In other words, regulating the apparent power is to regulate at least one of the active power and the reactive power.

The AF 213 as the control unit is connected to the power-receiving path of the converting unit that converts received power and supplies the converted power to the load used for the regulating, and the AF 213 is electrically parallel with the converting unit. The AF 213 controls the apparent power in the power-receiving path.

An example of a technique in which the HPS 21 regulates the parameter related to the apparent power in the electrical lines will be described. In a case where a harmonic current is generated in the electrical lines, the AF 213 of the HPS 21 supplies, to the electrical lines, a current having a phase for eliminating the harmonic current, to reduce the harmonic current in the electrical lines.

Another example of a technique in which the HPS 21 regulates the parameter related to the apparent power in the electrical lines will be described. In a case where reactive power is generated in the electrical lines, the AF 213 of the HPS 21 supplies a current to the electrical lines to reduce the reactive power in the electrical lines. Further, as the reactive power in the electrical lines diminishes, the power factor in the electrical lines improves.

As described above, in the present embodiment, the parameter related to the apparent power in the electrical lines of the power system 10 is regulated using the HPS 21. Here, as the parameter related to the apparent power varies, the apparent power also varies. Therefore, in a broad sense, regulating each of the above-described parameters related to the apparent power is regarded as regulating the apparent power. Hereinafter, each parameter related to the apparent power as a regulating target may be collectively referred to as "apparent power".

As the HPS 21, a system for regulating temperature or humidity is exemplified. More specifically, examples of the HPS 21 include equipment used in a heating ventilation and air conditioning (HVAC) system, such as an air conditioning apparatus, a showcase for conditioning the internal temperature, a refrigerator, a refrigerating machine, and a water heater.

When the HPS 21 is instructed by the control server 30 to regulate the apparent power in the electrical lines, the HPS 21 regulates the apparent power in the electrical lines according to the received instruction.

The load equipment 22 receives and consumes power supplied from the power plant 11 through the consumer-side power distribution line 19.

Further, in the present embodiment, each power consumption facility 20 is provided with a regulating-unit sensor 211S, a converting-apparatus sensor 212S, and an AF sensor 213S.

The regulating-unit sensor 211S detects information related to the environment of the regulating unit 211. More specifically, the regulating-unit sensor 211S detects the chloride ion concentration in the space where the regulating unit 211 is provided. In a case where the regulating unit 211 is provided outside the power consumption facility 20, the regulating-unit sensor 211S detects the chloride ion concentration outside the power consumption facility 20.

The converting-apparatus sensor 212S detects information related to the power-converting apparatus 212. More specifically, the converting-apparatus sensor 212S detects information related to the operation of the power-converting apparatus 212, and information related to the environment of the power-converting apparatus 212. Note that the information detected by the converting-apparatus sensor 212S will be described in detail later.

The AF sensor 213S detects information related to the AF 213. More specifically, the AF sensor 213S detects information related to the operation of the AF 213, and information related to the environment of the AF 213. Note that the information related to the operation of the AF 213 and the information related to the environment of the AF 213 will be described in detail later.

Further, the AF sensor 213S also detects a current value of the AF 213. More specifically, the AF sensor 213S detects a current value supplied by the AF 213 to regulate the apparent power in the power-receiving path of the power-converting apparatus 212, the current value per unit time, or the current value in a predetermined time. Note that in a case where the current value, the current value per unit time, and the current value in a predetermined time are described without being particularly distinguished from each other, they may be collectively referred to simply as the "current value". Further, the current value supplied by the AF 213 to regulate the apparent power in the power-receiving path of the power-converting apparatus 212 may be hereinafter referred to as a usage amount.

The regulating-unit sensor 211S, the converting-apparatus sensor 212S, and the AF sensor 213S detect the above-described target information at preset time intervals. The preset time intervals may be any time, but are, for example, three hours. When the regulating-unit sensor 211S, the converting-apparatus sensor 212S, and the AF sensor 213S detect target information, the regulating-unit sensor 211S, the converting-apparatus sensor 212S, and the AF sensor 213S transmit, to the control server 30, detected-value information indicating a detected value, together with HPS identification information for identifying the HPS 21 as the detection target.

Note that, for example, the converting-apparatus sensor 212S or the AF sensor 213S may be provided for each type of information to be detected.

Further, in the illustrated example, one power consumption facility 20 is provided for each consumer-side power distribution line 19, which is not limiting. For example, a plurality of power consumption facilities 20 may be provided for each consumer-side power distribution line 19. Further, the number of HPS 21 and the number of load equipment 22 provided for the power consumption facility 20 are not limited to the illustrated example. For example, a power consumption facility 20 may be provided with more HPS 21 and load equipment 22 than the illustrated number. Alternatively, there may be a power consumption facility 20 for which a HPS 21 or load equipment 22 is not provided.

The control server 30 is a server apparatus that controls operations of the AFs 213. More specifically, the control server 30 controls operations of the AFs 213 for regulating the apparent power in the electrical lines of the power system 10. When the control server 30 receives an instruction from the instruction server 40 to regulate the apparent power in the electrical lines, the control server 30 determines current values to be supplied by the AFs 213 of the HPSs 21 for this regulating. Note that the current value to be supplied by the AF 213 to regulate the apparent power in the electrical lines of the power system 10 may be hereinafter referred to as a regulating amount.

Further, in the present embodiment, the control server 30 calculates an indicator related to the limit of operations of the AF 213. As an indicator related to the limit of operations of the AF 213, the lifetime of the AF 213 is exemplified. The lifetime of the AF 213 is a limit within which a predetermined operation can be continued in spite of the temporal change of the AF 213. Further, as the predetermined operation, exemplified is an operation of the AF 213 for regulating the apparent power in the electrical lines of the power system 10. An example of the predetermined operation is supply of a current for regulating at least one of the active power and the reactive power. On the basis of the fact that the closer to the limit of operations of the AF 213, the more likely a failure occurs in the AF 213, the control server 30 determines the contents of the operation by the AF 213 to suppress the occurrence of a failure in the AF 213. In other words, on the basis of an indicator calculated regarding the limit of operations of the AF 213, the control server 30 determines the contents of the operation by the AF 213 to suppress the occurrence of a failure in the AF 213. Then an operation according to the determined contents is instructed to the HPS 21 to be used for the control.

The instruction server 40 is a server apparatus that instructs that the apparent power in the electrical lines of the power system 10 be regulated. When the instruction server 40 acquires, from the electrical-line sensors 10S, information detected by the electrical-line sensors 10S, the instruction server 40 identifies, from the acquired information, an electrical line whose apparent power needs to be regulated. Then the instruction server 40 transmits, to the control server 30, an instruction to regulate the apparent power in the electrical line. The instruction to regulate the apparent power is an instruction to regulate one or both of the active power and the reactive power. In other words, the instruction to regulate the apparent power is an instruction to regulate at least one of the active power and the reactive power.

The instruction server 40 and the control server 30 are built with, for example, a computer. For example, the instruction server 40 and the control server 30 may be configured with a single computer, or may be built with distributed processing by a plurality of computers. Alternatively, the instruction server 40 and the control server 30 may be built on virtual hardware provided by cloud computing. Note that hereinafter, the instruction server 40 and the control server 30 may be simply referred to as the "server" in a case where they are described without being particularly distinguished from each other.

In the present embodiment, the control server 30, each equipment provided for each power consumption facility 20, and the instruction server 40 are connected with each other via a network (not illustrated). Further, the instruction server 40 and each electrical-line sensor 10S are connected with each other via a network (not illustrated). It is sufficient if these networks can transmit and receive data. Further, for example, a communication line used to transmit and receive the data may be wired, wireless, or power line communication (PLC). Alternatively, a configuration in which connection with a communication destination is via a plurality of networks or communication lines may be.

Further, the number of the control server 30 is not limited to the illustrated example. For example, the power control system 1 may be provided with two or more control servers 30. Alternatively, the control server 30 may be provided for, for example, each power consumption facility 20.

Figure 2:
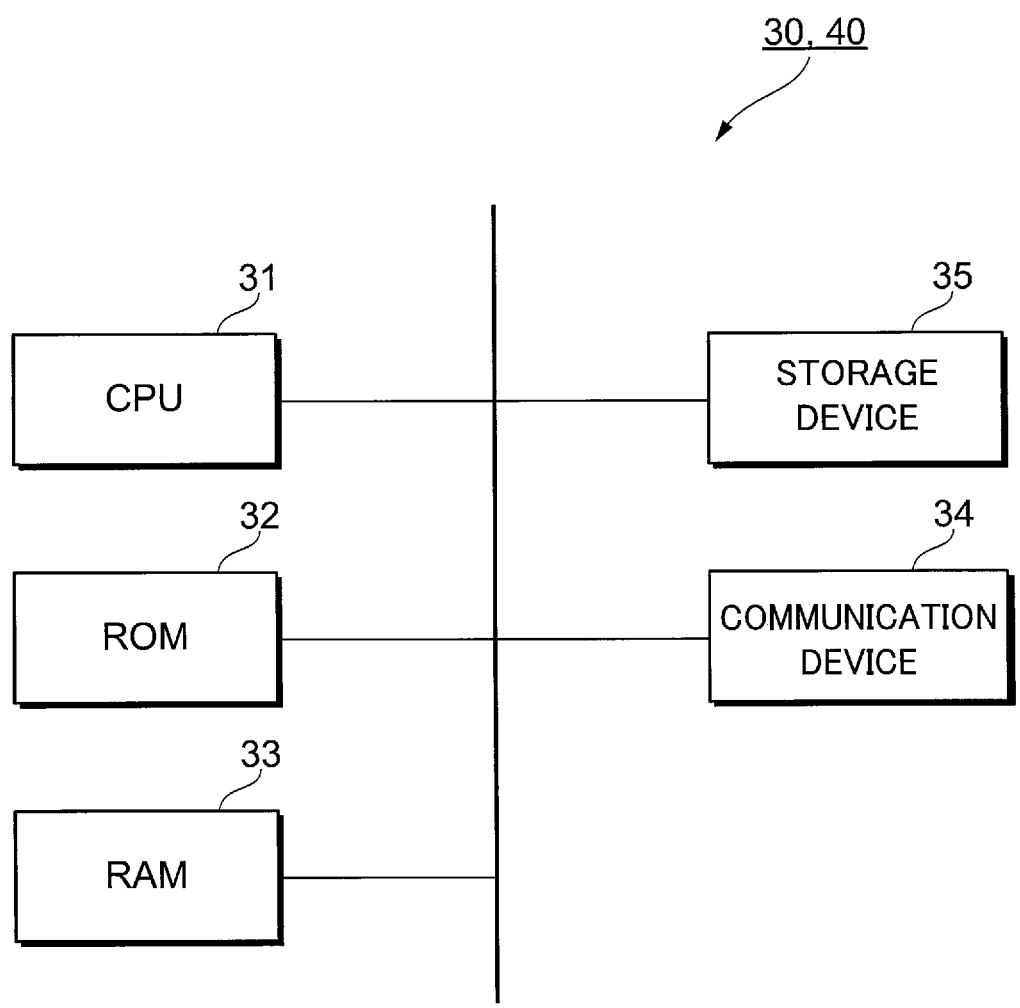
FIG. 2 is a diagram illustrating a hardware configuration of a control server and an instruction server.

FIG. 2 is a diagram illustrating a hardware configuration of the control server 30 and the instruction server 40.

The server is provided with a central processing unit (CPU) 31, a read only memory (ROM) 32, a random access memory (RAM) 33. Further, the server is also provided with a storage device 35 that is constituted by a hard disk device or the like, and stores information. In addition, the server is provided with a communication device 34 (communication interface (I/F)) that communicates with the outside.

Additionally, the server is provided with an input device used to input information, such as a keyboard and a mouse, and a display device, such as a liquid crystal display.

The ROM 32 and the storage device 35 store programs to be executed by the CPU 31. The CPU 31 reads a program stored in the ROM 32 or the storage device 35, and executes the program using the RAM 33 as a work area.

The CPU 31 executes a program stored in the ROM 32 or the storage device 35, so that each functional unit described below is implemented.

For example, the programs to be executed by the CPU 31 may be stored in a computer-readable recording medium, such as a magnetic recording medium (a magnetic tape, a magnetic disk, or the like), an optical recording medium (an optical disk or the like), a magneto-optical recording medium, or a semiconductor memory, to be provided for the server. Alternatively, the programs executed by the CPU 31 may be provided to the server using a communication means, such as the Internet.

Figure 3:
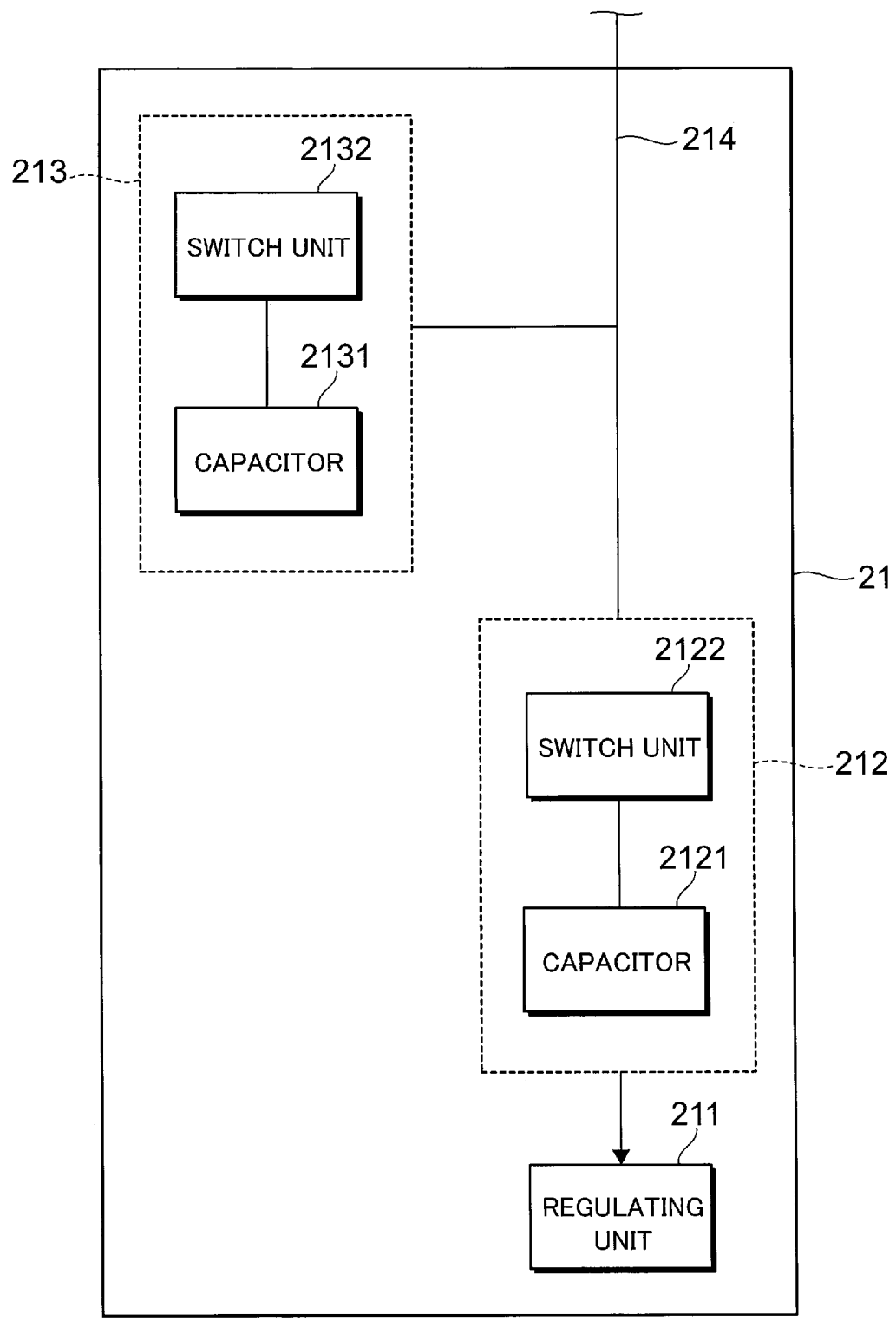
FIG. 3 is a diagram illustrating a functional configuration of a heat pump system (HPS).

FIG. 3 is a diagram illustrating a functional configuration of the HPS 21.

As described above, the HPS 21 is provided with the regulating unit 211, the power-converting apparatus 212, and the AF 213. Further, the HPS 21 is also provided with a power-receiving path 214 of the power-converting apparatus 212.

In the present embodiment, the AF 213 is connected to the power-receiving path 214 of the power-converting apparatus 212, and is electrically parallel with the power-converting apparatus 212. The AF 213 supplies a current to the power-receiving path 214 of the power-converting apparatus 212 to regulate the apparent power in the power-receiving path 214.

Further, the power-converting apparatus 212 is provided with a capacitor 2121 that performs charging and discharging, and a switch unit 2122 that performs an operation of switching between charging and discharging of the capacitor 2121. In the illustrated example, the one capacitor 2121 and the one switch unit 2122 are provided, but the capacitor 2121 and the switch unit 2122 are provided in each of an inverter (not illustrated) and a converter (not illustrated) of the power-converting apparatus 212.

Further, the AF 213 is provided with a capacitor 2131 that performs charging and discharging, and a switch unit 2132 that performs an operation of switching between charging and discharging of the capacitor 2131.

Figure 4:
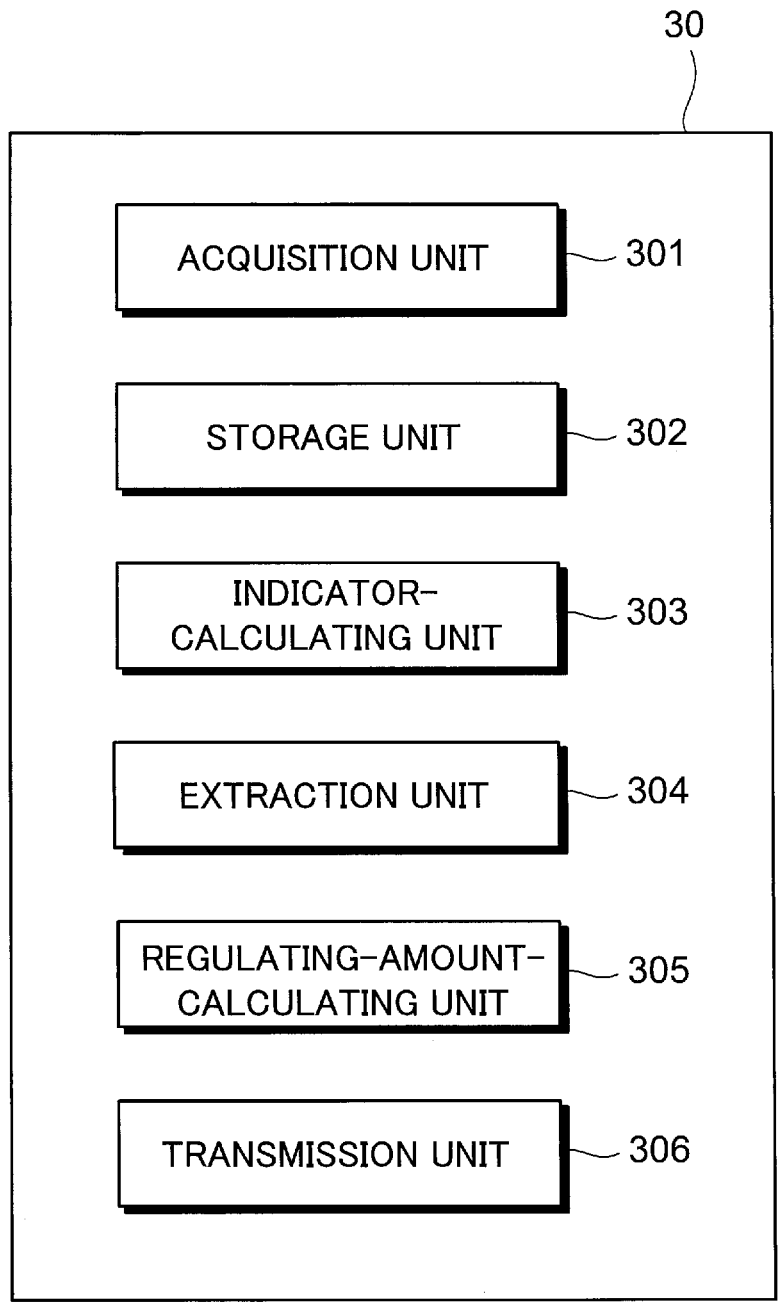
FIG. 4 is a diagram illustrating a functional configuration of the control server.

FIG. 4 is a diagram illustrating a functional configuration of the control server 30.

The control server 30 is provided with an acquisition unit 301, a storage unit 302, an indicator-calculating unit 303, an extraction unit 304, a regulating-amount-calculating unit 305, and a transmission unit 306.

The acquisition unit 301 as an example of an acquisition section acquires information transmitted to the control server 30, and information input into the control server 30. The information acquired by the acquisition unit 301 is stored in the storage unit 302.

The storage unit 302 stores information. The information stored in the storage unit 302 will be described in detail later.

The indicator-calculating unit 303 calculates an indicator related to the limit of operations of the HPS 21. More specifically, the indicator-calculating unit 303 calculates an indicator related to the limit of an operation of the HPS 21 for regulating temperature or humidity, and an indicator related to the limit of operations of the AF 213. The indicator-calculating unit 303 calculates the indicators using information detected by the regulating-unit sensor 211S, the converting-apparatus sensor 212S, and the AF sensor 213S.

The extraction unit 304 extracts candidates of the HPSs 21 to be used to regulate the apparent power in the electrical lines. Among the HPSs 21 provided for the power control system 1, the extraction unit 304 extracts the HPSs 21 that receive power through an electrical line as a regulating target, as candidates of the HPSs 21 to be used to regulate the electrical line.

The regulating-amount-calculating unit 305 calculates a regulating amount for the AF 213. More specifically, on the basis of an indicator calculated for the AF 213 by the indicator-calculating unit 303, the regulating-amount-calculating unit 305 calculates a regulating amount for the AF 213.

When the AF 213 close to the limit of operations of the AF 213 is operated, a failure may occur in the AF 213. Further, as a load generated in the AF 213 is increased, for example, as a current value supplied to the AF 213 is increased, a failure is more likely to occur in the AF 213. When a failure occurs in the AF 213, the AF 213 cannot regulate the apparent power in the power-receiving path 214. In this case, there is a fear that regulating of temperature or humidity by the HPS 21 is influenced. Therefore, in the present embodiment, on the basis of an indicator related to the limit of operations of the AF 213, the regulating-amount-calculating unit 305 calculates a regulating amount to suppress the occurrence of a failure in the AF 213.

The transmission unit 306 as an example of an output section transmits information to the instruction server 40 and the HPSs 21.

FIG. 5 is a diagram illustrating a HPS management table. The HPS management table is a table for managing the HPSs 21. The HPS management table is stored in the storage unit 302.

In the HPS management table, "HPS" shows HPS identification information. In the "HPS", "21'"s and "A" to "J" added to the "21'"s are each information for identifying which of the plurality of HPSs 21 is.

Further, in the HPS management table, "Passed electrical line" shows electrical-line identification information. The electrical-line identification information shown in the "Passed electrical line" is electrical-line identification information of an electrical line passed in supply of power to the "HPS". In the "Passed electrical line", "17'"s and "A" and "B" added to the "17'"s are each information for identifying which of the plurality of supply-receiving-side power distribution lines 17 is.

The "Passed electrical line" in the HPS management table is preliminarily set by a user of the power control system 1.

Further, in the HPS management table, "Operating time period" shows the operating time periods of the HPSs 21. "Op1" to "Op10" shown in "Power-converting apparatus" of the "Operating time period" are each information indicating the operating time period of the power-converting apparatus 212 of the associated "HPS". The operating time period of the power-converting apparatus 212 is information detected, as information related to operations of the power-converting apparatus 212, by the converting-apparatus sensor 212S. Further, "Oa1" to "Oa10" shown in "AF" of the "Operating time period" are each information indicating the operating time period of the AF 213 of the associated "HPS". The operating time period of the AF 213 is information detected, as information related to operations of the AF 213, by the AF sensor 213S.

When the acquisition unit 301 acquires, from a converting-apparatus sensor 212S, information indicating the operating time period of the power-converting apparatus 212, the acquisition unit 301 writes the acquired information in the "Operating time period" of the "Power-converting apparatus" associated with the target "HPS". Further, when the acquisition unit 301 acquires, from an AF sensor 213S, information indicating the operating time period of the AF 213, the acquisition unit 301 writes the acquired information in the "Operating time period" of the "AF" associated with the target "HPS".

Further, in the HPS management table, "Number of times of operations" shows the numbers of times of operations of the HPSs 21. "Np1" to "Np10" shown in "Power-converting apparatus" of the "Number of times of operations" are each information indicating the number of times of operations performed by the switch unit 2122 of the power-converting apparatus 212 of the associated "HPS". This number of times of operations is the number of times of operations by the switch unit 2122 for switching between charging and discharging of the capacitor 2121. Further, the number of times of operations performed by the switch unit 2122 is information detected, as information related to operations of the power-converting apparatus 212, by the converting-apparatus sensor 212S. Further, "Na1" to "Na10" shown in "AF" of the "Number of times of operations" are each information indicating the number of times of operations performed by the switch unit 2132 of the AF 213 of the associated "HPS". This number of times of operations is the number of times of operations by the switch unit 2132 for switching between charging and discharging of the capacitor 2131. Further, the number of times of operations performed by the switch unit 2132 is information detected, as information related to operations of the AF 213, by the AF sensor 213S.

When the acquisition unit 301 acquires, from a converting-apparatus sensor 212S, information indicating the number of times of operations performed by the switch unit 2122 of the power-converting apparatus 212, the acquisition unit 301 writes the acquired information in the "Number of times of operations" of the "Power-converting apparatus" associated with the target "HPS". Further, when the acquisition unit 301 acquires, from an AF sensor 213S, information indicating the number of times of operations performed by the switch unit 2132 of the AF 213, the acquisition unit 301 writes the acquired information in the "Number of times of operations" of the "AF" associated with the target "HPS".

Further, in the HPS management table, "Power amount" shows the power amounts integrated in the HPSs 21. "Ep1" to "Ep10" shown in "Power-converting apparatus" of the "Power amount" are each information indicating the power amount integrated in the capacitor 2121 of the power-converting apparatus 212 of the associated "HPS". The power amount integrated in the capacitor 2121 is information detected, as information related to operations of the power-converting apparatus 212, by the converting-apparatus sensor 212S. Further, "Ea1" to "Ea10" shown in "AF" of the "Power amount" are each information indicating the power amount integrated in the capacitor 2131 of the AF 213 of the associated "HPS". The power amount integrated in the capacitor 2131 is information detected, as information related to operations of the AF 213, by the AF sensor 213S.

When the acquisition unit 301 acquires, from a converting-apparatus sensor 212S, information indicating the power amount integrated in the capacitor 2121 of the power-converting apparatus 212, the acquisition unit 301 writes the acquired information in the "Power amount" of the "Power-converting apparatus" associated with the target "HPS". Further, when the acquisition unit 301 acquires, from an AF sensor 213S, information indicating the power amount integrated in the capacitor 2131 of the AF 213, the acquisition unit 301 writes the acquired information in the "Power amount" of the "AF" associated with the target "HPS".

Further, in the HPS management table, "Ambient temperature" shows the ambient temperatures of the HPSs 21. "Tp1" to "Tp10" shown in "Power-converting apparatus" of the "Ambient temperature" are each information indicating the ambient temperature of the capacitor 2121 in the power-converting apparatus 212 of the associated "HPS". The ambient temperature of the capacitor 2121 is information detected, as information related to the environment of the power-converting apparatus 212, by the converting-apparatus sensor 212S. Further, "Ta1" to "Ta10" shown in "AF" of the "Ambient temperature" are each information indicating the ambient temperature of the capacitor 2131 in the AF 213 of the associated "HPS". The ambient temperature of the capacitor 2131 is information detected, as information related to operations of the AF 213, by the AF sensor 213S.

When the acquisition unit 301 acquires, from a converting-apparatus sensor 212S, information indicating the ambient temperature of the capacitor 2121 in the power-converting apparatus 212, the acquisition unit 301 writes the acquired information in the "Ambient temperature" of the "Power-converting apparatus" associated with the target "HPS". Further, when the acquisition unit 301 acquires, from an AF sensor 213S, information indicating the ambient temperature of the capacitor 2131 in the AF 213, the acquisition unit 301 writes the acquired information in the "Ambient temperature" of the "AF" associated with the target "HPS".

Further, in the HPS management table, "Chloride ion concentration" shows the chloride ion concentrations in the spaces where the regulating units 211 of the HPSs 21 are provided. "C1" to "C10" shown in the "Chloride ion concentration" are each information indicating the chloride ion concentration in the space where the regulating unit 211 of the associated "HPS" is provided. The chloride ion concentration in the space where the regulating unit 211 is provided is information detected, as information related to the environment of the regulating unit 211, by the regulating-unit sensor 211S.

When the acquisition unit 301 acquires, from a regulating-unit sensor 211S, information indicating the chloride ion concentration in the space where the regulating unit 211 is provided, the acquisition unit 301 writes the acquired information in the "Chloride ion concentration" associated with the target "HPS".

Further, in the HPS management table, "Remaining time" shows remaining times until the limits within which the HPSs 21 can operate. "HPS" of the "Remaining time" shows remaining times until the limits within which the HPSs 21 can operate to regulate temperature or humidity. Information shown in the "Remaining time" of the "HPS" is results calculated, as indicators related to the limits of operations of the HPSs 21, by the indicator-calculating unit 303. Further, "AF" of the "Remaining time" shows remaining times until the limits within which the AFs 213 can operate. Information shown in the "Remaining time" of the "AF" is results calculated, as indicators related to the limits of operations of the AFs 213, by the indicator-calculating unit 303.

Further, in the HPS management table, "Regulatable amount" shows current values that can be supplied by the AFs 213 of the HPSs 21 to regulate the apparent power in the electrical lines. The current value that can be supplied by the AF 213 to regulate the apparent power in the electrical lines may be hereinafter referred to as a regulatable amount. In the present embodiment, each time the control server 30 acquires, from an AF sensor 213S, information indicating the usage amount, the control server 30 calculates a regulatable amount for the target AF 213.

An example of a technique in which the control server 30 calculates the regulatable amount will be described. The control server 30 subtracts, from the capacity of a current value of a target AF 213, a latest usage amount of the target AF 213 to calculate a value as a regulatable amount of the target AF 213. The capacity of a current value of the AF 213 is the maximum current value that the AF 213 can generate. As the capacity of a current value of the AF 213, for example, information described in the specifications of the HPS 21 may be used.

The control server 30 writes the calculated regulatable amount in the "Regulatable amount" associated with the target "HPS".

An example of the contents of the HPS management table will be described. The "HPS" identified from "21A" is associated with "17A" as the "Passed electrical line", is associated with "Op1" as the "Operating time period" of the "Power-converting apparatus", and is associated with "Oa1" as the "Operating time period" of the "AF". Further, the "HPS" identified from "21A" is associated with "Np1" as the "Number of times of operations" of the "Power-converting apparatus", is associated with "Na1" as the "Number of times of operations" of the "AF", is associated with "Ep1" as the "Power amount" of the "Power-converting apparatus", and is associated with "Ea1" as the "Power amount" of the "AF". Further, the "HPS" identified from "21A" is associated with "Tp1" as the "Ambient temperature" of the "Power-converting apparatus", is associated with "Ta1" as the "Ambient temperature" of the "AF", and is associated with "C1" as the "Chloride ion concentration". Further, the "HPS" identified from "21A" is associated with "20000" as the "Remaining time" of the "HPS", is associated with "10000" as the "Remaining time" of the "AF", and is associated with "60" as the "Regulatable amount".

(Processing of Indicator-Calculating Unit 303)

Next, the processing of the indicator-calculating unit 303 will be described.

The indicator-calculating unit 303 uses information detected by the regulating-unit sensor 211S, or information detected by the converting-apparatus sensor 212S to calculate a remaining time until the limit within which the HPS 21 can operate to regulate temperature or humidity. Note that hereinafter, a remaining time until the limit within which the HPS 21 can operate to regulate temperature or humidity may be referred to as a HPS remaining time.

For example, the indicator-calculating unit 303 may calculate a HPS remaining time on the basis of the fact that the limit within which the HPS 21 can operate is set according to the operating time period of the capacitor 2121 of the power-converting apparatus 212. More specifically, as the operating time period of the capacitor 2121 is longer, a shorter HPS remaining time may be calculated. Alternatively, the indicator-calculating unit 303 may calculate a HPS remaining time on the basis of the fact that the limit within which the HPS 21 can operate is set according to the number of times of operations performed by the switch unit 2122 of the power-converting apparatus 212. More specifically, as the number of times of operations performed by the switch unit 2122 is larger, a shorter HPS remaining time may be calculated. Alternatively, the indicator-calculating unit 303 may calculate a HPS remaining time on the basis of the fact that the limit within which the HPS 21 can operate is set according to the power amount integrated in the capacitor 2121 of the power-converting apparatus 212. More specifically, as the power amount integrated in the capacitor 2121 is larger, a shorter HPS remaining time may be calculated. Alternatively, the indicator-calculating unit 303 may calculate a HPS remaining time on the basis of the fact that the limit within which the HPS 21 can operate is set according to the ambient temperature of the capacitor 2121 of the power-converting apparatus 212. More specifically, as the ambient temperature of the capacitor 2121 is higher, a shorter HPS remaining time may be calculated. Alternatively, the indicator-calculating unit 303 may calculate a HPS remaining time on the basis of the fact that the limit within which the HPS 21 can operate is set according to the chloride ion concentration in the space where the regulating unit 211 is provided. More specifically, the indicator-calculating unit 303 may calculate, from the chloride ion concentration in the space where the regulating unit 211 is provided, the degree of oxidation of the heat exchanger (not illustrated) provided in the regulating unit 211. Then, for example, as the calculated degree of oxidation is higher, a shorter remaining time until the limit within which the regulating unit 211 can operate may be calculated. In other words, as the chloride ion concentration in the space where the regulating unit 211 is provided is higher, the indicator-calculating unit 303 may calculate a shorter HPS remaining time.

Alternatively, the indicator-calculating unit 303 may calculate, from the chloride ion concentration in the space where the regulating unit 211 is provided, a remaining time until the limit within which the regulating unit 211 can operate. Further, for example, from the operating time period of the power-converting apparatus 212, the ambient temperature of the capacitor 2121 of the power-converting apparatus 212, and the power amount integrated in the capacitor 2121, the indicator-calculating unit 303 may calculate a remaining time until the limit within which the capacitor 2121 can operate. Further, for example, the indicator-calculating unit 303 may calculate, from the number of times of operations performed by the switch unit 2122 of the power-converting apparatus 212, a remaining time until the limit within which the switch unit 2122 can operate. Then, for example, the shortest time of the remaining time until the limit within which the regulating unit 211 can operate, the remaining time until the limit within which the capacitor 2121 can operate, and the remaining time until the limit within which the switch unit 2122 can operate is determined as a HPS remaining time. In addition, for example, the indicator-calculating unit 303 may calculate a HPS remaining time according to a remaining time for the AF 213 described below.

Further, the indicator-calculating unit 303 uses information detected by the AF sensor 213S to calculate a remaining time until the limit within which the AF 213 can operate. Note that hereinafter, a remaining time until the limit within which the AF 213 can operate may be referred to as an AF remaining time.

For example, the indicator-calculating unit 303 may calculate an AF remaining time on the basis of the fact that the limit within which the AF 213 can operate is set according to the operating time period of the capacitor 2131 of the AF 213. More specifically, as the operating time period of the capacitor 2131 is longer, a shorter AF remaining time may be calculated. Alternatively, the indicator-calculating unit 303 may calculate an AF remaining time on the basis of the fact that the limit within which the AF 213 can operate is set according to the number of times of operations performed by the switch unit 2132 of the AF 213. More specifically, as the number of times of operations performed by the switch unit 2132 is larger, a shorter AF remaining time may be calculated. Alternatively, the indicator-calculating unit 303 may calculate an AF remaining time on the basis of the fact that the limit within which the AF 213 can operate is set according to the power amount integrated in the capacitor 2131 of the AF 213. More specifically, as the power amount integrated in the capacitor 2131 is larger, a shorter AF remaining time may be calculated. Alternatively, the indicator-calculating unit 303 may calculate an AF remaining time on the basis of the fact that the limit within which the AF 213 can operate is set according to the ambient temperature of the capacitor 2131 of the AF 213. More specifically, as the ambient temperature of the capacitor 2131 is higher, a shorter AF remaining time may be calculated.

Alternatively, the indicator-calculating unit 303 may calculate an AF remaining time, from the chloride ion concentration in the space where the regulating unit 211 is provided. Here, as the chloride ion concentration in the space where the regulating unit 211 is provided is higher, the regulating unit 211 is more susceptible to salt damage. Further, for example, when the regulating unit 211 suffers from salt damage, a load generated in the power-converting apparatus 212 to control the regulating unit 211 may increase. Accordingly, a load generated in the AF 213 to regulate the apparent power in the power-receiving path 214 increases, and thus, a remaining time until the limit within which the AF 213 can operate may shorten. From this viewpoint, as the chloride ion concentration in the space where the regulating unit 211 is provided is higher, the indicator-calculating unit 303 may calculate a shorter AF remaining time.

As described above, the information detected by the AF sensor 213S is information that influences the limit of operations by the AF 213. Hereinafter, the operating time period of the capacitor 2131 of the AF 213, the number of times of operations performed by the switch unit 2132 of the AF 213, the power amount integrated in the capacitor 2131 of the AF 213, and the ambient temperature of the capacitor 2131 of the AF 213 may be collectively referred to as AF information. The AF information is regarded as control unit information related to the limit of operations by the AF 213. Further, in a broad sense, the chloride ion concentration in the space where the regulating unit 211 is provided is also regarded as the control unit information. Further, the indicators calculated by the indicator-calculating unit 303 related to the limit of operations by the AF 213 are also regarded as the control unit information related to the limit of operations by the AF 213. Therefore, the indicator-calculating unit 303 is also regarded as an acquisition section that acquires the control unit information.

The indicator-calculating unit 303 calculates a HPS remaining time and an AF remaining time at preset time intervals. The preset time intervals may be any time, but are, for example, three hours. When the indicator-calculating unit 303 calculates a HPS remaining time, the indicator-calculating unit 303 writes the calculated result in the "Remaining time" of the "HPS" associated with the target "HPS" in the HPS management table. Further, when the indicator-calculating unit 303 calculates an AF remaining time, the indicator-calculating unit 303 writes the calculated result in the "Remaining time" of the "AF" associated with the target "HPS" in the HPS management table.

(Processing of Regulating-Amount-Calculating Unit 305)

Next, the processing of the regulating-amount-calculating unit 305 will be described.

The regulating-amount-calculating unit 305 calculates a regulating amount on the basis of a result calculated by the indicator-calculating unit 303. More specifically, the regulating-amount-calculating unit 305 calculates a regulating amount for the AF 213 on the basis of an AF remaining time calculated by the indicator-calculating unit 303.

For example, as an AF remaining time is shorter, the regulating-amount-calculating unit 305 may calculate a smaller regulating amount for the AF 213. Further, for example, the regulating-amount-calculating unit 305 may determine, on the basis of an AF remaining time, which of the parameters related to the apparent power in the electrical lines will be regulated. Further, for example, the regulating-amount-calculating unit 305 may determine, on the basis of an AF remaining time, whether or not to make the AF 213 regulate the apparent power in the electrical lines. Further, for example, the regulating-amount-calculating unit 305 may determine, on the basis of an AF remaining time, whether or not to make the AF 213 regulate the apparent power in the power-receiving path 214 of the HPS 21. Further, for example, the regulating-amount-calculating unit 305 may determine, from the relationship between an AF remaining time and a HPS remaining time, the contents of an operation of the AF 213.

Figure 6:
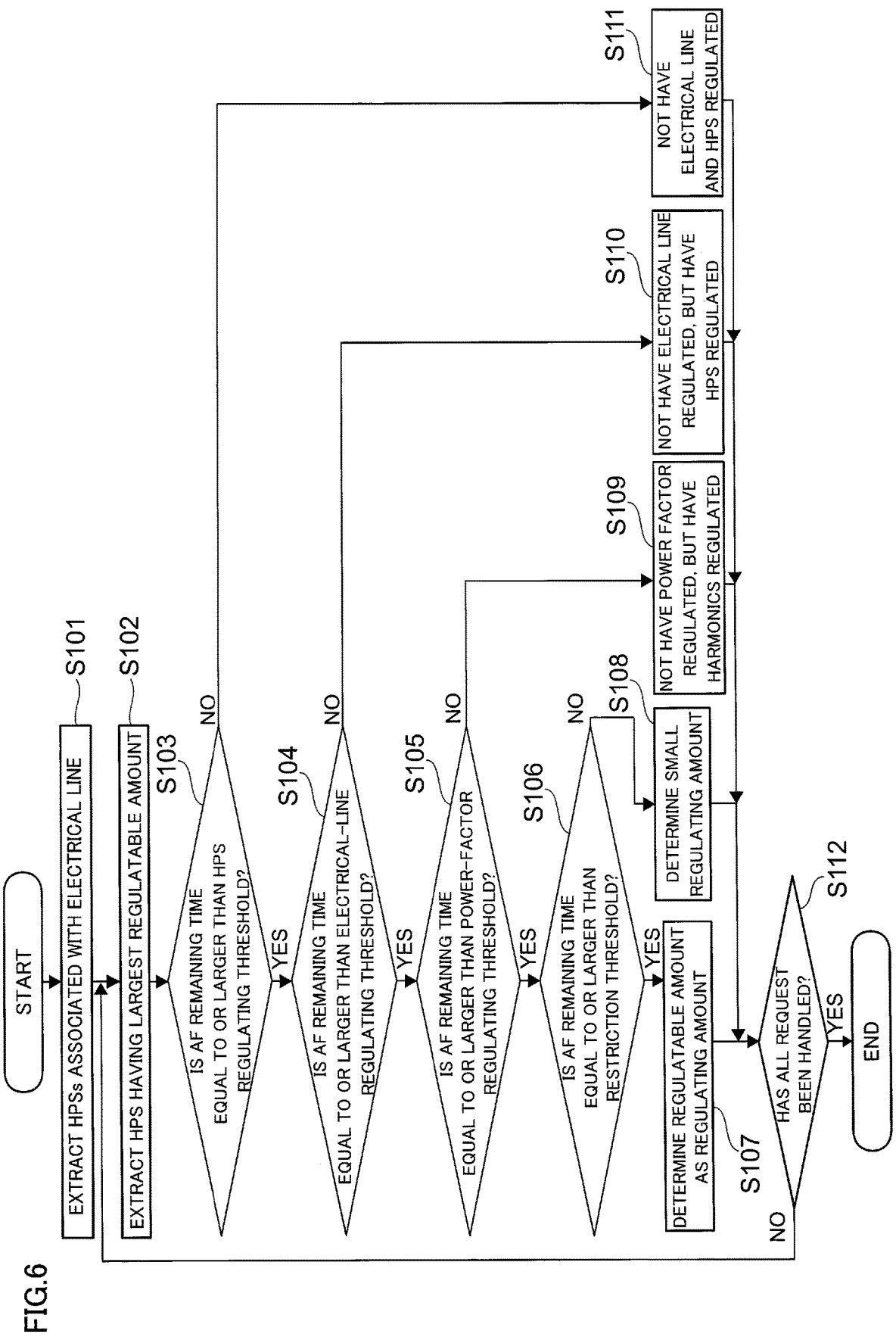
FIG. 6 is a flowchart illustrating the flow of operation determination processing.

FIG. 6 is a flowchart illustrating the flow of operation determination processing. The operation determination processing is processing in which the regulating-amount-calculating unit 305 determines the contents of an operation of the AF 213. In the present embodiment, when the instruction server 40 transmits, to the control server 30, a request to regulate the apparent power in a specific electrical line of the power system 10, the operation determination processing is started. Note that the request transmitted from the instruction server 40 to the control server 30 includes electrical-line identification information for identifying the electrical line as the regulating target. Further, hereinafter, the electrical line as the regulating target may be referred to as the regulating-target electrical line.

Further, in the following example, it is assumed that the supply-receiving-side power distribution line 17 of "17A" is the regulating-target electrical line. Further, it is assumed that the request to regulate the apparent power in the regulating-target electrical line includes a request to improve the power factor and a request to reduce the harmonics. Further, it is assumed that a current value required to improve the power factor in the regulating-target electrical line is "100". Hereinafter, the current value required to improve the power factor in the regulating-target electrical line may be referred to as the required regulating amount.

The extraction unit 304 extracts candidates of the HPSs 21 to be used to regulate the apparent power in the regulating-target electrical line. More specifically, the extraction unit 304 extracts the HPSs 21 associated with the regulating-target electrical line (step (hereinafter referred to as "S") 101). The extraction unit 304 refers to the HPS management table (see FIG. 5). Then the extraction unit 304 extracts the HPSs 21 identified from the "HPS" whose "Passed electrical line" is associated with the electrical-line identification information of the regulating-target electrical line.

In this example, five HPSs 21 of "21A" to "21E" are associated with "17A", which is the regulating-target electrical line. Therefore, the extraction unit 304 extracts the five HPSs 21 of "21A" to "21E".

The extraction unit 304 further extracts an HPS 21 from the extracted HPSs 21. More specifically, the extraction unit 304 extracts a HPS 21 having the largest regulatable amount (S102). The extraction unit 304 extracts a "HPS" associated with the largest "Regulatable amount" in the HPS management table.

In this example, of the five HPSs 21 extracted in step 101, "60", which is the largest "Regulatable amount", is shown for the HPS 21 of "21A". Therefore, the extraction unit 304 extracts the HPS 21 of "21A". Note that the HPS 21 extracted in step 102 may be hereinafter referred to as the extracted HPS 21. Further, an AF 213 provided for the extracted HPS 21 may be hereinafter referred to as the extracted AF 213.

The regulating-amount-calculating unit 305 ascertains whether or not the AF remaining time of the extracted HPS 21 is equal to or larger than a HPS regulating threshold (S103). The HPS regulating threshold is a threshold used to ascertain whether or not to make the extracted AF 213 regulate the apparent power in the power-receiving path 214 of the extracted HPS 21. In the present embodiment, even in a case where the extracted AF 213 is made to regulate the apparent power in the power-receiving path 214 of the extracted HPS 21, the AF remaining time is prevented from becoming excessively short with respect to the HPS remaining time. From this viewpoint, the HPS regulating threshold is set. Further, in the present embodiment, it is assumed that the HPS regulating threshold is one third of the HPS remaining time. From the relationship between the "Remaining time" of the "AF" and the "Remaining time" of the "HPS" associated with the extracted HPS 21 in the HPS management table, the regulating-amount-calculating unit 305 ascertains whether or not the AF remaining time is equal to or larger than the HPS regulating threshold.

In this example, "10000", which is the "Remaining time" of the "AF" in the HPS 21 of "21A", is one half of "20000", which is the "Remaining time" of the "HPS". Therefore, the regulating-amount-calculating unit 305 ascertains that the AF remaining time of the extracted HPS 21 is equal to or larger than the HPS regulating threshold (YES in S103).

In a case where the AF remaining time is equal to or larger than the HPS regulating threshold, the regulating-amount-calculating unit 305 ascertains whether or not the AF remaining time of the extracted HPS 21 is equal to or larger than an electrical-line regulating threshold (S104). The electrical-line regulating threshold is a threshold used to ascertain whether or not to make the extracted AF 213 regulate the apparent power in the regulating-target electrical line. In the present embodiment, in a case where the extracted AF 213 is made to regulate the apparent power in the regulating-target electrical line, the occurrence of a failure in the extracted AF 213 is suppressed. From this viewpoint, the electrical-line regulating threshold is set. Further, in the present embodiment, it is assumed that the electrical-line regulating threshold is "5000". From the "Remaining time" of the "AF" associated with the extracted HPS 21 in the HPS management table, the regulating-amount-calculating unit 305 ascertains whether or not the AF remaining time is equal to or larger than the electrical-line regulating threshold.

In this example, "10000", which is the "Remaining time" of the "AF" in the HPS 21 of "21A" is larger than "5000". Therefore, the regulating-amount-calculating unit 305 ascertains that the AF remaining time of the extracted HPS 21 is equal to or larger than the electrical-line regulating threshold (YES in S104).

In a case where the AF remaining time is equal to or larger than the electrical-line regulating threshold, the regulating-amount-calculating unit 305 ascertains whether or not the AF remaining time of the extracted HPS 21 is equal to or larger than a power-factor regulating threshold (S105). The power-factor regulating threshold is a threshold used to ascertain whether or not to make the extracted AF 213 regulate the power factor in the regulating-target electrical line. In the present embodiment, in a case where the extracted AF 213 is made to regulate the power factor in the regulating-target electrical line, the occurrence of a failure in the extracted AF 213 is suppressed. From this viewpoint, the power-factor regulating threshold is set. Further, in the present embodiment, it is assumed that the power-factor regulating threshold is "7000", which is larger than the electrical-line regulating threshold. From the "Remaining time" of the "AF" associated with the extracted HPS 21 in the HPS management table, the regulating-amount-calculating unit 305 ascertains whether or not the AF remaining time is equal to or larger than the power-factor regulating threshold.

In this example, "10000", which is the "Remaining time" of the "AF" in the HPS 21 of "21A" is larger than "7000". Therefore, the regulating-amount-calculating unit 305 ascertains that the AF remaining time of the extracted HPS 21 is equal to or larger than the power-factor regulating threshold (YES in S105).

In a case where the AF remaining time is equal to or larger than the power-factor regulating threshold, the regulating-amount-calculating unit 305 ascertains whether or not the AF remaining time of the extracted HPS 21 is equal to or larger than a restriction threshold (S106). The restriction threshold is a threshold used to ascertain whether or not to restrict the regulating amount in a case where the extracted AF 213 is made to regulate the power factor in the regulating-target electrical line. In the present embodiment, a failure that occurs in the extracted AF 213 in a case where the regulating amount is not restricted is suppressed. From this viewpoint, the restriction threshold is set. Further, in the present embodiment, it is assumed that the restriction threshold is "9000", which is larger than the power-factor regulating threshold. From the "Remaining time" of the "AF" associated with the extracted HPS 21 in the HPS management table, the regulating-amount-calculating unit 305 ascertains whether or not the AF remaining time is equal to or larger than the restriction threshold.

In this example, "10000", which is the "Remaining time" of the "AF" in the HPS 21 of "21A" is larger than "9000". Therefore, the regulating-amount-calculating unit 305 ascertains that the AF remaining time of the extracted HPS 21 is equal to or larger than the restriction threshold (YES in S106).

In a case where the AF remaining time is equal to or larger than the restriction threshold, the regulating-amount-calculating unit 305 determines, as the regulating amount for the extracted AF 213, the regulatable amount for the extracted AF 213 (S107).

In this example, "60", which is the "Regulatable amount", is determined as the regulating amount for the extracted AF 213 of "21A".

Alternatively, in a case where the AF remaining time is less than the restriction threshold (NO in S106), the regulating-amount-calculating unit 305 determines, as the regulating amount for the extracted AF 213, a value smaller than the regulatable amount of the extracted AF 213 (S108). In the present embodiment, the regulating-amount-calculating unit 305 determines, as the regulating amount, half of the regulatable amount of the extracted AF 213.

Alternatively, in a case where the AF remaining time is less than the power-factor regulating threshold (NO in S105), the regulating-amount-calculating unit 305 does not make the extracted AF 213 regulate the power factor in the regulating-target electrical line, but make the extracted AF 213 regulate the harmonics in the regulating-target electrical line (S109).

Alternatively, in a case where the AF remaining time is less than the electrical-line regulating threshold (NO in S104), the regulating-amount-calculating unit 305 does not make the extracted AF 213 regulate the apparent power in the regulating-target electrical line. Note that even in this case, in a case where the power-converting apparatus 212 of the extracted HPS 21 operates, the regulating-amount-calculating unit 305 makes the extracted AF 213 regulate the apparent power in the power-receiving path 214. In other words, the regulating-amount-calculating unit 305 does not make the extracted AF 213 regulate the apparent power in the regulating-target electrical line, but makes the extracted AF 213 regulate the apparent power in the HPS 21 (S110).

Alternatively, in a case where the AF remaining time is less than the HPS regulating threshold (NO in S103), the regulating-amount-calculating unit 305 does not make the extracted AF 213 regulate the apparent power in the regulating-target electrical line. Further, even in a case where the power-converting apparatus 212 of the extracted HPS 21 operates, the regulating-amount-calculating unit 305 does not make the extracted AF 213 regulate the apparent power in the power-receiving path 214. In other words, the regulating-amount-calculating unit 305 does not make the extracted AF 213 regulate the apparent power in the regulating-target electrical line and the apparent power in the extracted HPS 21 (S111).

When the processing of any one of steps 107 to 111 ends, the regulating-amount-calculating unit 305 ascertains whether or not all the request from the instruction servers 40 has been handled (S112). In the present embodiment, in a case where the request includes regulating the power factor in the regulating-target electrical line, the regulating-amount-calculating unit 305 ascertains, depending on whether or not the total value of determined regulating amounts is equal to or larger than the required regulating amount, whether or not the request to regulate the power factor in the regulating-target electrical line has been handled. Further, in a case where the request includes regulating the harmonics in the regulating-target electrical line, the regulating-amount-calculating unit 305 ascertains, depending on whether or not the HPS 21 to be used to regulate the harmonics in the regulating-target electrical line is determined, whether or not the request to regulate the harmonics in the regulating-target electrical line has been handled.

In this example, "60", which is the total value of regulating amounts determined by the regulating-amount-calculating unit 305 is less than "100", which is the required regulating amount. Further, the regulating-amount-calculating unit 305 does not determine the HPS 21 to be used to regulate the harmonics in the regulating-target electrical line. Therefore, the regulating-amount-calculating unit 305 ascertains that the request from the instruction server 40 has not been handled (NO in S112).

In a case where the request from the instruction server 40 has not been handled, the processing in and after step 102 is repeatedly performed. Here, the extraction unit 304 performs extraction again, and the extraction target is the remaining HPSs 21 except the HPS 21 already extracted in step 102.

In this example, from the HPSs 21 extracted in step 101, the extraction unit 304 extracts the HPS 21 of "21B", whose "Regulatable amount" is shown as "50", which is the largest after the HPS 21 of "21A".

Further, since "8000", which is the "Remaining time" of the "AF" in the HPS 21 of "21B" is larger than one third of "18000", which is the "Remaining time" of the "HPS", the regulating-amount-calculating unit 305 ascertains that the AF remaining time is equal to or larger than the HPS regulating threshold (YES in S103).

Further, since the "Remaining time" of the "AF" in the HPS 21 of "21B" is larger than "5000", the regulating-amount-calculating unit 305 ascertains that the AF remaining time is equal to or larger than the electrical-line regulating threshold (YES in S104).

Further, since the "Remaining time" of the "AF" in the HPS 21 of "21B" is larger than "7000", the regulating-amount-calculating unit 305 ascertains that the AF remaining time is equal to or larger than the power-factor regulating threshold (YES in S105).

On the other hand, since the "Remaining time" of the "AF" in the HPS 21 of "21B" is less than "9000", the regulating-amount-calculating unit 305 ascertains that the AF remaining time is less than the restriction threshold (NO in S106).

In this case, the regulating-amount-calculating unit 305 determines, as the regulating amount for the HPS 21 of "21B", "25", which is half of the "Regulatable amount" of the HPS 21 of "21B" (S108).

Thus, the total value of the regulating amounts determined by the regulating-amount-calculating unit 305 is "60+25=85". This total value is less than "100", which is the required regulating amount. Further, the regulating-amount-calculating unit 305 does not determine the HPS 21 to be used to regulate the harmonics in the regulating-target electrical line. Therefore, the regulating-amount-calculating unit 305 ascertains that the request from the instruction server 40 has not been handled (NO in S112), and the processing in and after step 102 is repeatedly performed.

From the HPSs 21 extracted in step 101, the extraction unit 304 extracts the HPS 21 of "21C", whose "Regulatable amount" is shown as "45", which is the largest after the HPS 21 of "21B" (S102).

Further, since "6000", which is the "Remaining time" of the "AF" in the HPS 21 of "21C" is larger than one third of "16000", which is the "Remaining time" of the "HPS", the regulating-amount-calculating unit 305 ascertains that the AF remaining time is equal to or larger than the HPS regulating threshold (YES in S103).

Further, since the "Remaining time" of the "AF" in the HPS 21 of "21C" is larger than "5000", the regulating-amount-calculating unit 305 ascertains that the AF remaining time is equal to or larger than the electrical-line regulating threshold (YES in S104).

On the other hand, since the "Remaining time" of the "AF" in the HPS 21 of "21C" is less than "7000", the regulating-amount-calculating unit 305 ascertains that the AF remaining time is less than the power-factor regulating threshold (NO in S105).

In this case, the regulating-amount-calculating unit 305 determines to make the HPS 21 of "21C" regulate the harmonics in the regulating-target electrical line, and not to make the HPS 21 of "21C" regulate the power factor in the regulating-target electrical line (S109).

Thus, the HPS 21 to be used to regulate the harmonics in the regulating-target electrical line is determined. On the other hand, the total value of the regulating amounts determined by the regulating-amount-calculating unit 305 is "85", which is less than "100", which is the required regulating amount. Therefore, the regulating-amount-calculating unit 305 ascertains that the request from the instruction server 40 has not been handled (NO in S112), and the processing in and after step 102 is repeatedly performed.

From the HPSs 21 extracted in step 101, the extraction unit 304 extracts the HPS 21 of "21E", whose "Regulatable amount" is shown as "40", which is the largest after the HPS 21 of "21C" (S102).

On the other hand, since "500", which is the "Remaining time" of the "AF" in the HPS 21 of "21E" is less than one third of "8000", which is the "Remaining time" of the "HPS", the regulating-amount-calculating unit 305 ascertains that the AF remaining time is less than the HPS regulating threshold (NO in S103).

In this case, the regulating-amount-calculating unit 305 does not make the HPS 21 of "21E" regulate the apparent power in the regulating-target electrical line. Further, even in a case where the power-converting apparatus 212 in the HPS 21 of "21E" operates, the regulating-amount-calculating unit 305 does not make the AF 213 regulate the apparent power in the power-receiving path 214 (S111).

Thus, the total value of the regulating amounts determined by the regulating-amount-calculating unit 305 is still "85", which is less than "100", which is the required regulating amount. Therefore, the regulating-amount-calculating unit 305 ascertains that the request from the instruction server 40 has not been handled (NO in S112), and the processing in and after step 102 is repeatedly performed.

From the HPSs 21 extracted in step 101, the extraction unit 304 extracts the HPS 21 of "21D", whose "Regulatable amount" is shown as "30", which is the largest after the HPS 21 of "21E", (S102).

Further, since "7000", which is the "Remaining time" of the "AF" in the HPS 21 of "21D" is larger than one third of "17000", which is the "Remaining time" of the "HPS", the regulating-amount-calculating unit 305 ascertains that the AF remaining time is equal to or larger than the HPS regulating threshold (YES in S103).

Further, since the "Remaining time" of the "AF" in the HPS 21 of "21D" is larger than "5000", the regulating-amount-calculating unit 305 ascertains that the AF remaining time is equal to or larger than the electrical-line regulating threshold (YES in S104).

Further, since the "Remaining time" of the "AF" in the HPS 21 of "21D" is "7000", the regulating-amount-calculating unit 305 ascertains that the AF remaining time is equal to or larger than the power-factor regulating threshold (YES in S105).

On the other hand, since the "Remaining time" of the "AF" in the HPS 21 of "21D" is less than "9000", the regulating-amount-calculating unit 305 ascertains that the AF remaining time is less than the restriction threshold (NO in S106).

In this case, the regulating-amount-calculating unit 305 determines, as the regulating amount, "15", which is half of the "Regulatable amount" of the HPS 21 of "21D" (S108).

Thus, the total value of the regulating amounts determined by the regulating-amount-calculating unit 305 becomes "100", and reaches "100", which is the required regulating amount. Further, as described above, the HPS 21 to be used to regulate the harmonics in the regulating-target electrical line has been determined. Therefore, the regulating-amount-calculating unit 305 ascertains that all the request from the instruction servers 40 has been handled (YES in S112).

The transmission unit 306 instructs the HPSs 21 which are the instruction targets, with information, as operation instructions, indicating the contents of the operation determined in the operation determination processing. When the HPSs 21 receive the instructions, the HPSs 21 operate according to the contents of the received instructions. Further, the HPSs 21 which have received an instruction not to perform the regulating cease to perform the regulating according to the instruction.

As described above, in the operation determination processing, the regulating-amount-calculating unit 305 determines, according to the lifetime of the AF 213, the contents of an operation to be performed by the AF 213, to suppress the occurrence of a failure in the AF 213.

Note that, for example, even in a case where there is no request to regulate the apparent power in the electrical lines, the regulating-amount-calculating unit 305 may ascertain, for each HPS 21, at predetermined time intervals, whether or not the AF remaining time is equal to or larger than the HPS regulating threshold. Then, on the basis of the ascertainment result, the regulating-amount-calculating unit 305 may determine whether or not to make the AF 213 regulate the apparent power in the power-receiving path 214 of the HPS 21.

As described above, in the present embodiment, the acquisition unit 301 acquires AF information. Further, on the basis of the AF information, the indicator-calculating unit 303 calculates an indicator related to the limit of operations by the AF 213. Then, on the basis of a result calculated by the indicator-calculating unit 303, the regulating-amount-calculating unit 305 controls the operation of the AF 213. In other words, the regulating-amount-calculating unit 305 controls the operation of the AF 213 on the basis of the AF information. Therefore, the regulating-amount-calculating unit 305 is also regarded as a control section that controls the operation of the AF 213.

In this case, the operation of the AF 213 is controlled on the basis of the limit of operations of the AF 213.

In particular, in the present embodiment, the AFs 213 can regulate the apparent power in the electrical lines. In addition, on the basis of AF information, the regulating-amount-calculating unit 305 controls the operation of the AF 213 for regulating the apparent power in the regulating-target electrical line.

In this case, the contents of the regulating of the apparent power in the regulating-target electrical line are set according to the limit of operations by the AF 213. Therefore, compared with a case where the operation of the AF 213 is controlled regardless of the limit of operations by the AF 213, the apparent power in the regulating-target electrical line is regulated with the contents of the regulating suitable for the limit of operations by the AF 213.

Further, in the present embodiment, AF information is information related to operations of the AF 213 that affect the limit of operations by the AF 213 and information related to the environment of the AF 213.

In this case, compared with a case where the operation of the AF 213 is controlled on the basis of information not related to the AF 213, the AF 213 is operated with the contents suitable for the AF 213.

Further, in the present embodiment, the regulating-amount-calculating unit 305 controls the operation of the AF 213 on the basis of the relationship between the HPS remaining time and the AF remaining time.

In this case, compared with a case where the operation of the AF 213 is controlled regardless of the HPS remaining time, the AF 213 is operated such that the HPS remaining time and the AF remaining time have a suitable relationship.

Further, in the present embodiment, in a case where the AF remaining time is less than the restriction threshold, the regulating-amount-calculating unit 305 restricts the operation of the AF 213 for regulating the apparent power in the regulating-target electrical line.

In this case, compared with a case where the operation of the AF 213 is not restricted even when the AF remaining time is less than the restriction threshold, the occurrence of a failure in the AF 213 is suppressed. Therefore, the influence on the operation of the HPS 21 for regulating temperature or humidity is suppressed.

Further, in the present embodiment, in a case where the AF remaining time is equal to or larger than the HPS regulating threshold, and is less than the electrical-line regulating threshold, the regulating-amount-calculating unit 305 restricts the operation of the AF 213 for regulating the apparent power in the regulating-target electrical line, but does not restrict the operation of the AF 213 for regulating the apparent power in the power-receiving path 214. In addition, in a case where the AF remaining time is less than the HPS regulating threshold, and is less than the electrical-line regulating threshold, the regulating-amount-calculating unit 305 restricts both the operation of the AF 213 for regulating the apparent power in the regulating-target electrical line and the operation of the AF 213 for regulating the apparent power in the power-receiving path 214.

In a case where no failure occurs in the AF 213, and the AF 213 does not regulate the apparent power in the power-receiving path 214, the operation of the HPS 21 may be influenced, but the HPS 21 can regulate temperature or humidity. On the other hand, when a failure occurs in the AF 213, there is a fear that the failure increases an influence on the regulating of temperature or humidity by the HPS 21.

Therefore, in the present embodiment, according to the limit of operations of the AF 213, stepwise control is performed for the restriction of the operation for suppressing a failure of the AF 213, so that an increase in the influence on the operation of the HPS 21 is suppressed.

Further, in the present embodiment, the acquisition unit 301 acquires information on the chloride ion concentration in the space where the regulating unit 211 is provided. Further, on the basis of the chloride ion concentration, the indicator-calculating unit 303 calculates an AF remaining time. Then, on the basis of the AF remaining time, the regulating-amount-calculating unit 305 controls the operation of the AF 213. In other words, on the basis of information on the chloride ion concentration in the space where the regulating unit 211 is provided, the regulating-amount-calculating unit 305 controls the operation of the AF 213.

In this case, the operation of the AF 213 is controlled according to the influence, on the limit of operations of the AF 213, of the environment of the regulating unit 211.

Further, in the present embodiment, regulating the apparent power in a regulating-target electrical line includes regulating the power factor in the regulating-target electrical line, and regulating the harmonics in the regulating-target electrical line. In addition, on the basis of AF information, the regulating-amount-calculating unit 305 determines a target, in the regulating-target electrical line, that the regulating-amount-calculating unit 305 will make the AF 213 regulate.

In this case, according to the limit of operations by the AF 213, the target, in the regulating-target electrical line, that the regulating-amount-calculating unit 305 will make the AF 213 regulate is determined. Therefore, compared with a case where the target that the regulating-amount-calculating unit 305 will make the AF 213 regulate is determined regardless of the limit of operations by the AF 213, the target, in the regulating-target electrical line, that the regulating-amount-calculating unit 305 will make the AF 213 regulate is appropriately determined.

In particular, in the present embodiment, in a case where an AF remaining time is equal to or larger than the power-factor regulating threshold, the regulating-amount-calculating unit 305 makes the AF 213 regulate the power factor in the regulating-target electrical line, and in a case where an AF remaining time is less than the power-factor regulating threshold, and is equal to or larger than the electrical-line regulating threshold, the regulating-amount-calculating unit 305 makes the AF 213 regulate the harmonics in the regulating-target electrical line.

In a case where a regulating target in a regulating-target electrical line is the power factor, the load generated in the AF 213 tends to be larger than in a case where a regulating target is the harmonics. Therefore, in the present embodiment, according to the limit of operations of the AF 213, the magnitude of the load generated in the AF 213 due to the regulating of the apparent power in the regulating-target electrical line is regulated.

Note that in a case where a request from the instruction server 40 does not include regulating the harmonics in the regulating-target electrical line, in step 109 of the operation determination processing, the regulating-amount-calculating unit 305 does not make an extracted HPS 21 regulate the harmonics.

Further, in the present embodiment, the regulating-amount-calculating unit 305 makes one HPS 21 regulate the harmonics in a regulating-target electrical line, which is not limiting. For example, the regulating-amount-calculating unit 305 may make a plurality of HPSs 21 regulate the harmonics in a regulating-target electrical line. In this case, on the basis of the AF remaining time for each HPS 21, the regulating-amount-calculating unit 305 may determine, for each AF 213, the load generated in the AF 213 due to the regulating of the harmonics in the regulating-target electrical line.

Figure 7:
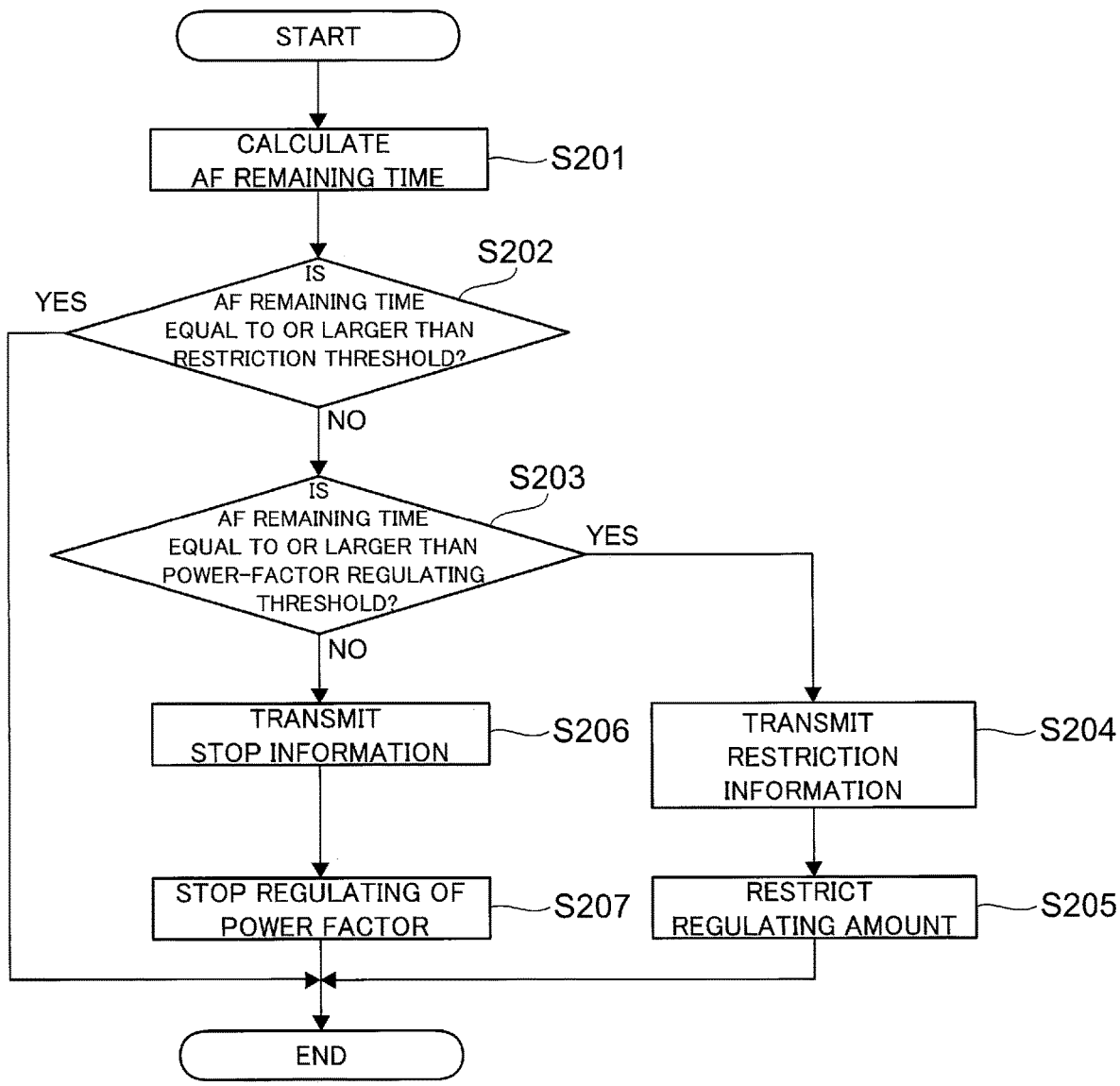
FIG. 7 is a flowchart illustrating the flow of processing during regulating.

FIG. 7 is a flowchart illustrating the flow of processing during regulating. The processing during regulating is processing that controls the operation of a HPS 21 that is regulating the power factor in a regulating-target electrical line. In a case where a plurality of HPSs 21 that is regulating the power factor in a regulating-target electrical line exists, the processing during regulating is performed for each HPS 21. Further, in a case where a HPS 21 is regulating the power factor in a regulating-target electrical line, the processing during regulating is started at preset time intervals. The preset time intervals may be any time, but are, for example, three hours. Note that a HPS 21 that is a control target in the processing during regulating may be hereinafter referred to as a target HPS 21.

The indicator-calculating unit 303 calculates an AF remaining time for a target HPS 21 (S201). In the HPS management table (see FIG. 5), the indicator-calculating unit 303 overwrites, with the calculated AF remaining time, the "Remaining time" of the "AF" associated with the target "HPS".

The regulating-amount-calculating unit 305 ascertains whether or not the AF remaining time for the target HPS 21 is equal to or larger than the restriction threshold (S202). In a case where the AF remaining time is equal to or larger than the restriction threshold (YES in S202), the processing during regulating ends. In this case, the operation of the target HPS 21 is not restricted, and the regulating of the power factor in the regulating-target electrical line by the target HPS 21 is continued.

Alternatively, in a case where the AF remaining time is less than the restriction threshold (NO in S202), the regulating-amount-calculating unit 305 ascertains whether or not the AF remaining time is equal to or larger than the power-factor regulating threshold (S203).

In a case where the AF remaining time is equal to or larger than the power-factor regulating threshold (YES in S203), the transmission unit 306 transmits, to the instruction server 40, restriction information on the target HPS 21, together with HPS identification information for identifying the target HPS 21 (S204). As the restriction information, exemplified is information indicating that the regulating amount for the target HPS 21 is to be restricted.

Further, the regulating-amount-calculating unit 305 restricts the regulating amount for the AF 213 of the target HPS 21 (S205). In the present embodiment, the regulating-amount-calculating unit 305 determines, as a new regulating amount, half of the present regulating amount for the AF 213 of the target HPS 21. The transmission unit 306 transmits, to the target HPS 21, the new regulating amount as an operation instruction.

On the other hand, in a case where the AF remaining time is less than the power-factor regulating threshold (NO in S203), the transmission unit 306 transmits, to the instruction server 40, stop information for the target HPS 21, together with HPS identification information for identifying the target HPS 21 (S206). As the stop information, exemplified is information indicating that the regulating of the power factor in the regulating-target electrical line by the target HPS 21 is to be stopped.

Further, the regulating-amount-calculating unit 305 determines to stop the regulating of the power factor in the regulating-target electrical line by the AF 213 (S207). The transmission unit 306 transmits, to the target HPS 21, an instruction to stop the regulating. Thereafter, a manager who manages the target HPS 21 can perform maintenance of the target HPS 21 as necessary.

Further, a manager who manages the instruction servers 40 receives the restriction information or the stop information, and can additionally request the control server 30 to regulate the power factor in the regulating-target electrical line with a HPS 21, as necessary.

As described above, in the present embodiment, even when the apparent power in a regulating-target electrical line is being regulated by an AF 213, the operation of the AF 213 is restricted on the basis of the AF remaining time.

In this case, the occurrence of a failure in the AF 213 due to the AF 213 operating for a long time is suppressed.

Further, in the present embodiment, in a case where an AF 213 is regulating the apparent power in a regulating-target electrical line, and the AF remaining time is less than the restriction threshold, the transmission unit 306 outputs restriction information or stop information.

In this case, compared with a case where information related to the HPS 21 is output regardless of whether or not the AF remaining time is less than the restriction threshold, output of information that is related to the HPS 21 and is not suitable for notification from the viewpoint of the limit of operations of the AF 213 is suppressed.

Note that in the present disclosure, it has been described that the HPS 21 regulates the apparent power in the supply-receiving-side power distribution lines 17. However, for example, a target electrical line whose apparent power is to be regulated may be the power transmission line 12 or the supply-side power distribution line 14.

Further, in the present disclosure, in a case where the regulating-amount-calculating unit 305 makes an AF 213 regulate the apparent power in a regulating-target electrical line, the regulating-amount-calculating unit 305 makes the AF 213 regulate the power factor or the harmonics, which is not limiting. For example, on the basis of an AF remaining time, the regulating-amount-calculating unit 305 may make one AF 213 regulate both the power factor and the harmonics in a regulating-target electrical line.

Further, in the present disclosure, the regulating-amount-calculating unit 305 restricts the regulating amount for the AF 213 to restrict the operation of the AF 213. Here, the restriction of the operation of the AF 213 is not limited to the restriction of the regulating amount.

For example, the regulating-amount-calculating unit 305 may shorten a time during which the AF 213 regulates the apparent power in a regulating-target electrical line, to restrict the operation of the AF 213.

Further, in the present disclosure, an example in which the parameters, such as the usage amount, the regulating amount, the regulatable amount, and the required regulating amount, are currents has been described, which is not limiting. For example, each parameter may be any one of the parameters described above as the parameters related to the apparent power.

Further, in the present disclosure, information used to calculate a HPS remaining time is the power amount integrated in the one capacitor 2121 provided in the power-converting apparatus 212 or the number of times of operations performed by the one switch unit 2122 provided in the power-converting apparatus 212, which is not limiting.

For example, the indicator-calculating unit 303 may calculate a HPS remaining time on the basis of the power amount integrated in a capacitor provided in the inverter (not illustrated) of the power-converting apparatus 212, and the power amount integrated in a capacitor provided in the converter (not illustrated) of the power-converting apparatus 212. Alternatively, the indicator-calculating unit 303 may calculate a HPS remaining time on the basis of the number of times of operations performed by a switch unit provided in the inverter (not illustrated) of the power-converting apparatus 212, and the number of times of operations performed by a switch unit provided in the converter (not illustrated) of the power-converting apparatus 212.

Further, an indicator related to the limit of operations of the AF 213 is not limited to the AF remaining time. For example, the indicator-calculating unit 303 may calculate, as an indicator related to the limit of operations of the AF 213, the remaining number of times of operations that can be performed by the switch unit 2132 of the AF 213. Alternatively, the indicator-calculating unit 303 may calculate, as an indicator related to the limit of operations of the AF 213, the magnitude of the risk of the occurrence of a failure in the AF 213. Alternatively, the indicator-calculating unit 303 may calculate, as an indicator related to the limit of operations of the AF 213, the degree of deterioration of the AF 213.

Further, an indicator related to the limit of operations of the AF 213 is not limited to an indicator calculated by the indicator-calculating unit 303. For example, an indicator related to the limit of operations of the AF 213 may be the operating time period of the AF 213, the number of times of operations performed by the switch unit 2132 of the AF 213, the power amount integrated in the capacitor 2131 of the AF 213, the ambient temperature of the capacitor 2131 of the AF 213, or the like. In other words, an indicator related to the limit of operations of the AF 213 may be information detected by the AF sensor 213S.

Further, an indicator related to the limit of operations of the HPS 21 for regulating temperature or humidity is not limited to the HPS remaining time. For example, the indicator-calculating unit 303 may calculate, as an indicator related to the limit of operations of the HPS 21, the remaining number of times of operations that can be performed by the switch unit 2122 of the power-converting apparatus 212. Alternatively, the indicator-calculating unit 303 may calculate, as an indicator related to the limit of operations of the HPS 21, the magnitude of the risk of the occurrence of a failure in the HPS 21. Alternatively, the indicator-calculating unit 303 may calculate, as an indicator related to the limit of operations of the HPS 21, the degree of deterioration of the HPS 21.

Further, an indicator related to the limit of operations of the HPS 21 for regulating temperature or humidity is not limited to an indicator calculated by the indicator-calculating unit 303. For example, an indicator related to the limit of operations of the HPS 21 may be the operating time period of the power-converting apparatus 212, the number of times of operations performed by the switch unit 2122 of the power-converting apparatus 212, the power amount integrated in the capacitor 2121 of the power-converting apparatus 212, or the like. Alternatively, an indicator related to the limit of operations of the HPS 21 may be the ambient temperature of the capacitor 2121 of the power-converting apparatus 212, the chloride ion concentration in the space where the regulating unit 211 is provided, or the like. In other words, an indicator related to the limit of operations of the HPS 21 may be information detected by the regulating-unit sensor 211S, or may be information detected by the converting-apparatus sensor 212S.

Further, information detected by the AF sensor 213S is not limited to the above examples.

For example, the AF sensor 213S may detect a current value integrated in the capacitor 2131 of the AF 213.

Alternatively, the AF sensor 213S may detect variations in the voltage applied to the capacitor 2131 of the AF 213. Alternatively, the AF sensor 213S may detect the operating rate of the AF 213. Then, for example, on the basis of the current value integrated in the capacitor 2131, the variations in the voltage applied to the capacitor 2131, and the operating rate of the AF 213, the indicator-calculating unit 303 may calculate an indicator related to the limit of operations of the AF 213.

Further, information detected by the converting-apparatus sensor 212S is not limited to the above examples.

For example, the converting-apparatus sensor 212S may detect a current value integrated in the capacitor 2121 of the power-converting apparatus 212. Alternatively, the converting-apparatus sensor 212S may detect variations in the voltage applied to the capacitor 2121. Alternatively, the converting-apparatus sensor 212S may detect the operating rate of the power-converting apparatus 212. Then, for example, on the basis of the current value integrated in the capacitor 2121, the variations in the voltage applied to the capacitor 2121, and the operating rate of the power-converting apparatus 212, the indicator-calculating unit 303 may calculate an indicator related to the limit of operations of the HPS 21 for regulating temperature or humidity.

Further, a technique in which the indicator-calculating unit 303 calculates an indicator related to the limit of operations of the AF 213 is not limited to the above examples.

For example, the indicator-calculating unit 303 may subtract a value detected by the AF sensor 213S, from a value set for the limit of operations by the AF 213, to calculate a value as an indicator related to the limit of operations of the AF 213. As the value set for the limit of operations by the AF 213, exemplified are a limit value of the operating time period of the AF 213, a limit value of the power amount integrated in the capacitor 2131 of the AF 213, and a limit value of the number of times of operations performed by the switch unit 2132 of the AF 213.

Alternatively, as the value set for the limit of operations by the AF 213, a value described in the specifications of the HPS 21 may be used.

Alternatively, the indicator-calculating unit 303 may calculate, on the basis of a result of machine learning, an indicator related to the limit of operations of the AF 213. More specifically, the indicator-calculating unit 303 uses, as training data, information on an AF 213 that has reached the end of its lifetime, to learn the relationship between information detected by the AF sensor 213S and the limit of operations of the AF 213. As the training data, exemplified are information for an AF 213 that has reached the end of its lifetime, and detected by the AF sensor 213S when the AF 213 has operated, and information related to the limit of operations by the AF 213. As the information related to the limit of operations by the AF 213, exemplified are the operating time period until the end of the lifetime of the AF 213, the power amount integrated in the capacitor 2131 until the end of the lifetime of the AF 213, and the number of times of operations performed by the switch unit 2132 until the end of the lifetime of the AF 213. On the basis of the learned result, the indicator-calculating unit 303 uses, as input, information detected by the AF sensor 213S, to generate a learned model that outputs an indicator related to the limit of operations by the AF 213. Then, for example, on the basis of the generated learned model, the indicator-calculating unit 303 may calculate, from information detected by the AF sensor 213S, an indicator related to the limit of operations by the AF 213.

Further, a technique in which the indicator-calculating unit 303 calculates an indicator related to the limit of operations of the HPS 21 for regulating temperature or humidity is not limited to the above examples.

For example, the indicator-calculating unit 303 may subtract a value detected by the converting-apparatus sensor 212S, from a value set for the limit of operations of the HPS 21, to calculate a value as an indicator related to the limit of operations of the HPS 21 for regulating temperature or humidity. As the value set for the limit of operations of the HPS 21, exemplified are a limit value of the operating time period of the power-converting apparatus 212, a limit value of the power amount integrated in the capacitor 2121 of the power-converting apparatus 212, and a limit value of the number of times of operations performed by the switch unit 2122 of the power-converting apparatus 212. Alternatively, as the value set for the limit of operations by the HPS 21, a value described in the specifications of the HPS 21 may be used.

Alternatively, the indicator-calculating unit 303 may calculate, on the basis of a result of machine learning, an indicator related to the limit of operations of the HPS 21 for regulating temperature or humidity. More specifically, the indicator-calculating unit 303 uses, as training data, information on a HPS 21 that has reached the end of its lifetime, to learn the relationship between information detected by the regulating-unit sensor 211S or the converting-apparatus sensor 212S, and the limit of operations of the HPS 21 for regulating temperature or humidity. As the training data, exemplified are information for a HPS 21 that has reached the end of its lifetime, and detected by the regulating-unit sensor 211S or the converting-apparatus sensor 212S when the HPS 21 has operated, and information related to the limit of operations of the HPS 21 for regulating temperature or humidity. As the information related to the limit of operations of the HPS 21 for regulating temperature or humidity, exemplified are the operating time period of the power-converting apparatus 212 until the end of the lifetime of the HPS 21, the power amount integrated in the capacitor 2121 until the end of the lifetime of the HPS 21, and the number of times of operations performed by the switch unit 2122 until the end of the lifetime of the HPS 21. On the basis of the learned result, the indicator-calculating unit 303 uses, as input, information detected by the regulating-unit sensor 211S or the converting-apparatus sensor 212S, to generate a learned model that outputs an indicator related to the limit of operations of the HPS 21 for regulating temperature or humidity. Then, for example, on the basis of the generated learned model, the indicator-calculating unit 303 may calculate, from information detected by the regulating-unit sensor 211S or the converting-apparatus sensor 212S, an indicator related to the limit of operations of the HPS 21 for regulating temperature or humidity.

Further, in the present disclosure, it has been described that the control server 30 controls the operation of the AF 213 on the basis of the limit of operations by the AF 213. Here, for example, the control server 30 may control the operation of the AF 213, from the relationship between the limit of operations by the AF 213 and a scheduled period in which a user is going to use the AF 213.

An example of a technique in which the control server 30 controls the operation of the AF 213, from the relationship between the limit of operations by the AF 213 and a scheduled period in which a user is going to use the AF 213. A user inputs, into the control server 30, a scheduled period in which the user is going to use an AF 213, so that the control server 30 acquires information indicating the scheduled period in which the user is going to use the AF 213. Further, the control server 30 calculates, from the acquired information, a time during which the AF 213 operates in a case where the user uses the AF 213 for the scheduled period without restriction of the operation by the AF 213. Then, for example, in a case where the AF remaining time is shorter than the calculated time, the control server 30 may restrict the operation by the AF 213 to control the operation of the AF 213 so that the AF 213 is used for the period scheduled by the user.

Further, in the present disclosure, the control server 30 is configured to control the operation of the AF 213, which is not limiting.

For example, the HPS 21 may have the functions of the control server 30. In other words, for example, the HPS 21 may be provided with the CPU 31 (see FIG. 2), the ROM 32, the RAM 33, the communication device 34, and the storage device 35 for implementing the various functions. In addition, for example, this HPS 21 may have the functions of the acquisition unit 301, the storage unit 302, the indicator-calculating unit 303, the extraction unit 304, the regulating-amount-calculating unit 305, the transmission unit 306, and the like of the control server 30.

Here, each of the above-described embodiments can be regarded as follows:

The regulating-amount-calculating unit 305 of the present embodiment controls the operation of the AF 213 on the basis of the control unit information.

In this case, on the basis of the limit of operations of the AF 213 that is connected to the power-receiving path 214 of the power-converting apparatus 212, is electrically parallel with the power-converting apparatus 212, and controls the apparent power in the power-receiving path 214 of the power-converting apparatus 212, the operation of the AF 213 is controlled.

Further, the limit of operations by the AF 213 is a time point at which the AF 213 becomes unable to perform a predetermined operation due to the temporal change.

In this case, the operation of the AF 213 is controlled according to the time point at which the AF 213 becomes unable to perform the predetermined operation due to the temporal change.

Further, on the basis of the control unit information, the regulating-amount-calculating unit 305 controls the operation of the AF 213 for regulating the apparent power in the regulating-target electrical line.

In this case, the contents of the regulating of the apparent power in the regulating-target electrical line are set according to the limit of operations by the AF 213. Therefore, compared with a case where the operation of the AF 213 is controlled regardless of the limit of operations by the AF 213, the apparent power in the regulating-target electrical line is regulated with the contents of the regulating suitable for the limit of operations by the AF 213.

Further, the control unit information is information related to operations of the AF 213 that affect the limit of operations by the AF 213 and/or related to the environment of the AF 213.

In this case, compared with a case where the operation of the AF 213 is controlled on the basis of information not related to the AF 213, the AF 213 is operated with the contents suitable for the AF 213.

Further, the regulating-amount-calculating unit 305 controls the operation of the AF 213 on the basis of the relationship between the HPS remaining time and the AF remaining time.

In this case, compared with a case where the operation of the AF 213 is controlled regardless of the HPS remaining time, the AF 213 is operated such that the HPS remaining time and the AF remaining time have a suitable relationship.

Further, in a case where an indicator related to the limit of operations by the AF 213 satisfies a preset condition, the regulating-amount-calculating unit 305 restricts the operation of the AF 213 for regulating the apparent power in the regulating-target electrical line. As the case where the indicator related to the limit of operations by the AF 213 satisfies the preset condition, exemplified is a fact that the AF remaining time is less than the restriction threshold.

In this case, compared with a case where the operation of the AF 213 is not restricted even when the AF remaining time is less than the restriction threshold, the occurrence of a failure in the AF 213 is suppressed. Therefore, the influence on the operation of the HPS 21 for regulating temperature or humidity is suppressed.

Further, the condition includes a first condition and a second condition different from each other. In addition, in a case where the indicator satisfies the first condition and does not satisfy the second condition, the regulating-amount-calculating unit 305 restricts the operation of the AF 213 for regulating the apparent power in the regulating-target electrical line, and does not restrict the operation of the AF 213 for regulating the apparent power in the power-receiving path 214, and in a case where the indicator satisfies both the first condition and the second condition, the regulating-amount-calculating unit 305 restricts both the operation of the AF 213 for regulating the apparent power in the regulating-target electrical line and the operation of the AF 213 for regulating the apparent power in the power-receiving path 214. As the first condition, exemplified is a fact that the AF remaining time is less than the electrical-line regulating threshold. Further, as the second condition, exemplified is a fact that the AF remaining time is less than the HPS regulating threshold.

In this case, according to the limit of operations of the AF 213, stepwise control is performed for the restriction of the operation for suppressing a failure of the AF 213, so that an increase in the influence on the operation of the HPS 21 is suppressed.

Further, the regulating-amount-calculating unit 305 controls the operation of the AF 213 on the basis of the control unit information and environmental information. As the environmental information, exemplified is information related to the environment of the regulating unit 211.

In this case, the operation of the AF 213 is controlled according to the influence, on the limit of operations of the AF 213, of the environment of the regulating unit 211.

Further, the regulating of the apparent power in the regulating-target electrical line includes regulating the power factor in the regulating-target electrical line, and regulating the harmonics in the regulating-target electrical line. In addition, on the basis of the control unit information, the regulating-amount-calculating unit 305 determines a target, in the regulating-target electrical line, that the regulating-amount-calculating unit 305 will make the AF 213 regulate.

In this case, according to the limit of operations by the AF 213, the target, in the regulating-target electrical line, that the regulating-amount-calculating unit 305 will make the AF 213 regulate is determined. Therefore, compared with a case where the target that the regulating-amount-calculating unit 305 will make the AF 213 regulate is determined regardless of the limit of operations by the AF 213, the target, in the regulating-target electrical line, that the regulating-amount-calculating unit 305 will make the AF 213 regulate is appropriately determined.

Further, a predetermined first condition and a second condition related to being closer to the limit of operations by the AF 213 than the first condition is are set for the AF remaining time. In a case where an AF remaining time satisfies the first condition, the regulating-amount-calculating unit 305 makes the AF 213 regulate the power factor in the regulating-target electrical line. In a case where an AF remaining time satisfies the second condition, the regulating-amount-calculating unit 305 makes the AF 213 regulate the harmonics in the regulating-target electrical line. As the first condition, exemplified is a fact that the AF remaining time is equal to or larger than the power-factor regulating threshold. Further, as the second condition, exemplified is a fact that the AF remaining time is less than the power-factor regulating threshold and is equal to or larger than the electrical-line regulating threshold.

In this case, according to the limit of operations of the AF 213, the magnitude of the load generated in the AF 213 due to the regulating of the apparent power in the regulating-target electrical line is regulated.

Further, in a case where the AF 213 is regulating the apparent power in the regulating-target electrical line, and the AF remaining time satisfies a preset condition, the transmission unit 306 outputs the restriction information. As the preset condition, exemplified is a fact that the AF remaining time becomes less than the restriction threshold.

In this case, compared with a case where the restriction information is output regardless of whether or not the AF remaining time is less than the restriction threshold, output of information that is related to the HPS 21 and is not suitable for notification from the viewpoint of the limit of operations of the AF 213 is suppressed.

Further, the HPS 21 of the present embodiment regarded from another viewpoint includes: the power-converting apparatus 212 that converts received power and supplies the converted power to a load used for regulating; the AF 213 that is connected to the power-receiving path 214 of the power-converting apparatus 212, is electrically parallel with the power-converting apparatus 212, and controls the apparent power in the power-receiving path 214; an acquisition section that acquires control unit information related to the limit of operations by the AF 213; and a control section that controls the operation of the AF 213 on the basis of the control unit information.

On the basis of the limit of operations of the AF 213 that is connected to the power-receiving path 214 of the power-converting apparatus 212, is electrically parallel with the power-converting apparatus 212, and controls the apparent power in the power-receiving path 214 of the power-converting apparatus 212, the operation of the AF 213 is controlled.

Further, each configuration described above is not limited to the above-described embodiment, and can be changed without departing from the scope of the spirit. In other words, it is understood that various changes in the form and detail can be made without departing from the spirit and scope of the claims.

The configurations described above are not limiting, for example, part of each configuration described above may be omitted, or another function may be added to each configuration described above.

REFERENCE SIGNS LIST 1 power control system, 10 power system, 10S electrical-line sensor, 11 power plant, 14 supply-side power distribution line, 16 supply-receiving-side substation, 17 supply-receiving-side power distribution line, 20 power consumption facility, 21 HPS, 30 control server, 40 instruction server, 211 regulating unit, 212 power-converting apparatus, 213 AF

The invention claimed is:

1. A power control system comprising:
an acquisition section that acquires control unit information related to a first limit of a first operation by a control unit provided for a heat pump system that regulates temperature and/or humidity; and
a control section that controls the first operation of the control unit based on the control unit information, wherein
the control unit is connected to a power-receiving path of a converting unit that converts received power and supplies the converted power to a load used for the regulating, the control unit is electrically parallel with the converting unit, and the control unit controls apparent power in the power-receiving path,
the heat pump system receives power from an electrical line of a power distribution system, via a power distribution transformer,
the control unit is configured to regulate apparent power in the electrical line,
the control section controls, based on the control unit information, a second operation of the control unit for regulating the apparent power in the electrical line,
in a case where a first indicator related to the first limit satisfies a preset condition, the control section restricts the second operation of the control unit for regulating the apparent power in the electrical line,
the preset condition includes a first condition and a second condition different from each other, and
in response to the first indicator satisfying the first condition and not satisfying the second condition, the control section restricts the second operation for regulating the apparent power in the electrical line and does not restrict a third operation for controlling the apparent power in the power-receiving path, and in response to the first indicator satisfying both the first condition and the second condition, the control section restricts both the second operation for regulating the apparent power in the electrical line and the third operation for controlling the apparent power in the power-receiving path.

2. The power control system according to claim 1, wherein the first limit of the first operation is a time point at which a predetermined operation becomes impossible due to a temporal change.

3. The power control system according to claim 2, wherein the control unit information is information related to a fourth operation of the control unit that affects the first limit and/or related to an environment of the control unit.

4. The power control system according to claim 2, wherein the control section controls a fourth operation of the control unit based on a relationship between a second indicator related to a second limit of a fifth operation of the heat pump system for regulating temperature and/or humidity and a third indicator related to the first limit of the first operation of the control unit.

5. The power control system according to claim 2, wherein
the heat pump system is provided with a heat-exchanging unit that performs heat exchange,
the acquisition section acquires environmental information related to an environment of the heat-exchanging unit, and
the control section controls a fourth operation of the control unit based on the control unit information and the environmental information.

6. The power control system according to claim 1, wherein the control unit information is information related to a fourth operation of the control unit that affects the first limit and/or related to an environment of the control unit.

7. The power control system according to claim 1, wherein the control section controls a fourth operation of the control unit based on a relationship between a second indicator related to a second limit of a fifth operation of the heat pump system for regulating temperature and/or humidity and a third indicator related to the first limit of the first operation of the control unit.

8. The power control system according to claim 1, wherein
the heat pump system is provided with a heat-exchanging unit that performs heat exchange,
the acquisition section acquires environmental information related to an environment of the heat-exchanging unit, and
the control section controls a fourth operation of the control unit based on the control unit information and the environmental information.

9. The power control system according to claim 1, wherein
the regulating of the apparent power in the electrical line includes regulating a power factor in the electrical line and regulating harmonics in the electrical line, and
the control section determines, based on the control unit information, a target, in the electrical line, that the control section makes the control unit regulate.

10. The power control system according to claim 9, wherein
the control unit information is a second indicator related to the first limit,
a third condition and a fourth condition related to being closer to the first limit than the third condition are set for the second indicator, and
in response to the second indicator satisfying the third condition, the control section makes the control unit regulate the power factor in the electrical line, and in response to the second indicator satisfying the fourth condition, the control section makes the control unit regulate harmonics in the electrical line.

11. The power control system according to claim 1, further comprising an output section that, in response to the control unit regulating the apparent power in the electrical line, and a second indicator related to the first limit satisfying a third condition, outputs information related to the heat pump system.

12. A heat pump system for regulating temperature and/or humidity, the heat pump system comprising:
a converting unit that converts received power and supplies the converted power to a load used for the regulating;
a control unit that is connected to a power-receiving path of the converting unit, is electrically parallel with the converting unit, and controls apparent power in the power-receiving path;
an acquisition section that acquires control unit information related to a first limit of a first operation by the control unit; and
a control section that controls the first operation of the control unit based on the control unit information,
the heat pump system receives power from an electrical line of a power distribution system, via a power distribution transformer,
the control unit is configured to regulate apparent power in the electrical line, and
the control section controls, based on the control unit information, a second operation of the control unit for regulating the apparent power in the electrical line,
in a case where an indicator related to the first limit satisfies a preset condition, the control section restricts the second operation of the control unit for regulating the apparent power in the electrical line,
the preset condition includes a first condition and a second condition different from each other, and
in response to the indicator satisfying the first condition and not satisfying the second condition, the control section restricts the second operation for regulating the apparent power in the electrical line and does not restrict a third operation for controlling the apparent power in the power-receiving path, and in response to the indicator satisfying both the first condition and the second condition, the control section restricts both the second operation for regulating the apparent power in the electrical line and the third operation for controlling the apparent power in the power-receiving path.

* * * * *